United States Patent
Korbecki et al.

(10) Patent No.: US 9,256,652 B2
(45) Date of Patent: Feb. 9, 2016

(54) SYSTEMS AND METHODS FOR COMBINING MEDIA RECOMMENDATIONS FROM MULTIPLE RECOMMENDATION ENGINES

(71) Applicant: Rovi Guides, Inc., Santa Clara, CA (US)

(72) Inventors: William J. Korbecki, Crystal Lake, IL (US); Brian Peterson, Barrington, IL (US); Benjamin H. Maughan, Pleasanton, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 172 days.

(21) Appl. No.: 14/105,548

(22) Filed: Dec. 13, 2013

(65) Prior Publication Data

US 2015/0169705 A1 Jun. 18, 2015

(51) Int. Cl.
| | |
|---|---|
| G06F 17/30 | (2006.01) |
| H04N 21/25 | (2011.01) |
| H04N 21/258 | (2011.01) |
| H04N 21/2665 | (2011.01) |
| H04N 21/442 | (2011.01) |
| H04N 21/45 | (2011.01) |
| H04N 21/462 | (2011.01) |
| H04N 21/466 | (2011.01) |
| H04N 21/475 | (2011.01) |
| H04N 21/482 | (2011.01) |

(52) U.S. Cl.
CPC ........ *G06F 17/30554* (2013.01); *H04N 21/251* (2013.01); *H04N 21/25891* (2013.01); *H04N 21/2665* (2013.01); *H04N 21/44222* (2013.01); *H04N 21/4532* (2013.01); *H04N 21/4622* (2013.01); *H04N 21/4668* (2013.01); *H04N 21/4755* (2013.01); *H04N 21/4826* (2013.01)

(58) Field of Classification Search
USPC ................................................ 707/736, 802
See application file for complete search history.

(56) References Cited

U.S. PATENT DOCUMENTS

| 7,231,419 | B1 | 6/2007 | Gheorghe et al. |
| 8,209,721 | B2 | 6/2012 | Trauth |
| 2009/0049030 | A1* | 2/2009 | Svendsen .............. G11B 27/105 |
| 2009/0178081 | A1 | 7/2009 | Goldenberg et al. |
| 2009/0300008 | A1* | 12/2009 | Hangartner .......... G11B 27/105 |
| 2010/0042460 | A1 | 2/2010 | Kane |
| 2011/0029636 | A1* | 2/2011 | Smyth ................. G06F 17/3089 709/217 |
| 2011/0161153 | A1* | 6/2011 | Carvis .................... G06Q 10/10 705/14.25 |
| 2012/0036523 | A1 | 2/2012 | Weintraub et al. |
| 2012/0173383 | A1* | 7/2012 | Badawiyeh ............ G06Q 50/01 705/26.7 |
| 2013/0046761 | A1* | 2/2013 | Soderberg ......... G06F 17/30038 707/736 |
| 2013/0060648 | A1 | 3/2013 | Maskatia et al. |
| 2014/0304277 | A1* | 10/2014 | Veugen ............. G06F 17/30017 707/748 |

OTHER PUBLICATIONS

International Search Report, International Application No. PCT/US2014/070024, mailed Mar. 13, 2015, 12 pages.

* cited by examiner

*Primary Examiner* — Cam-Linh Nguyen
(74) *Attorney, Agent, or Firm* — Ropes & Gray LLP

(57) ABSTRACT

Systems and methods are presented for combining media recommendations from multiple recommendation engines. In some embodiments, a recommendation system receives a first indication that a first media recommendation was generated by a first content provider, the first media recommendation being associated with a first media asset. The recommendation system receives a second indication that a second media recommendation was generated by a second content provider, and then determines whether the second media recommendation is associated with the first media asset. In response to determining that the second media recommendation is associated with the first media asset, the recommendation system generates a combined recommendation representing the first and second media recommendations.

18 Claims, 14 Drawing Sheets

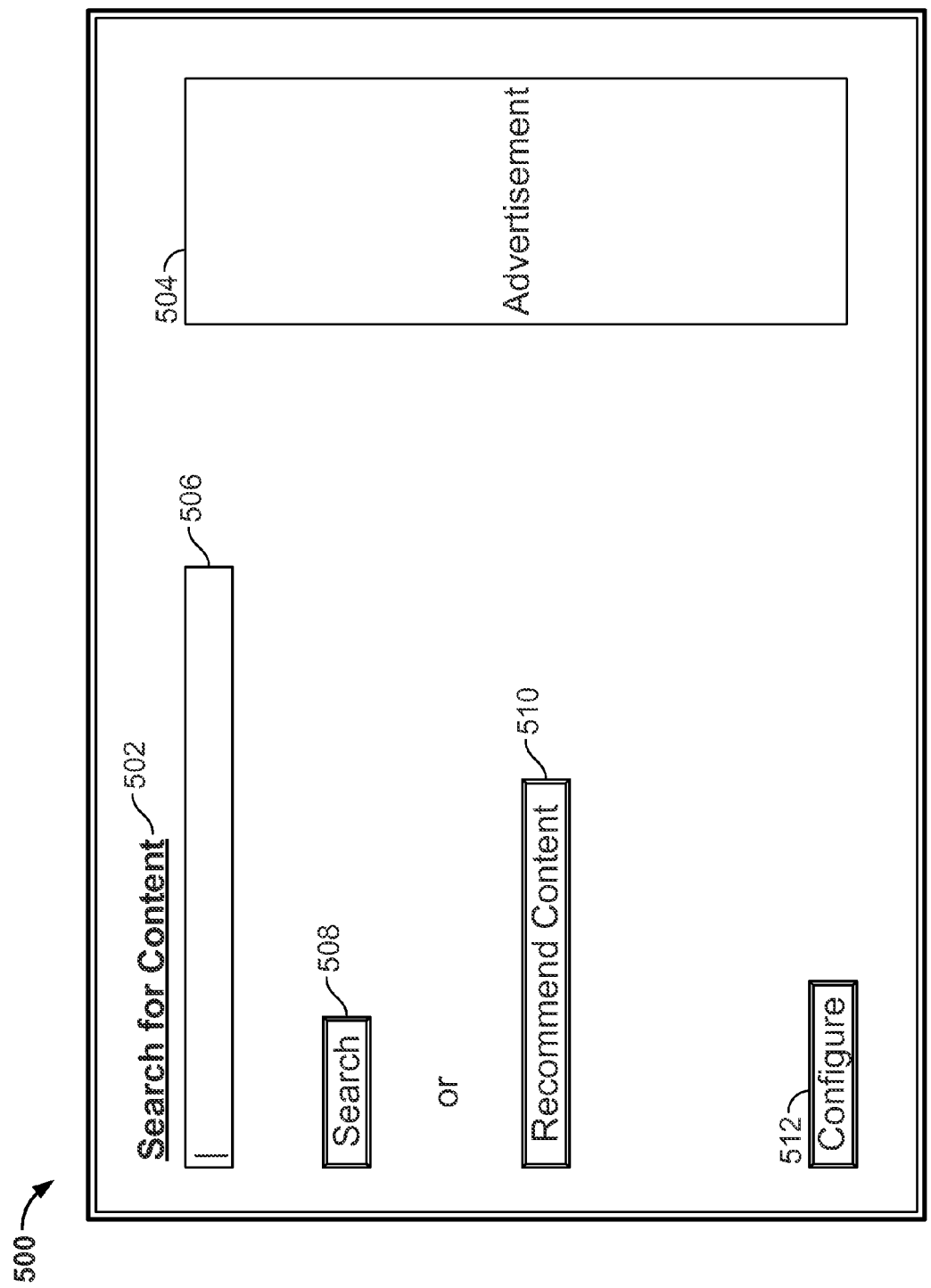

SYSTEMS AND METHODS FOR COMBINING MEDIA RECOMMENDATIONS FROM MULTIPLE RECOMMENDATION ENGINES

BACKGROUND

Users are interested in reducing the time involved in finding media content of interest to them. To find content, users typically resort to content recommendation engines, which are able to predict content that a user might like based on tracked viewing habits of the user, the way the user has rated similar content, or based on demographic information.

However, it is often the case that users are dissatisfied with individual recommendation engines in the sense that those systems do not "understand" them. These engines are typically managed in isolation in that they are forced to work independently to gather pieces of information about a user. As such, each engine tends to have only a portion of the knowledge on an individual. This inherently limits the degree to which the engine is able to understand its audience and reduces the effectiveness of any resulting analytics on that data.

SUMMARY

These and other objects are accomplished in accordance with the principles of the present invention by consolidating media recommendations from a plurality of content providers to generate combined media recommendations.

In some embodiments, a recommendation system receives a first indication that a first media recommendation for a user was generated by a first content provider, for example, by analyzing user profile data or by receiving an indication directly from the first content provider that generated the recommendation for the user. The recommendation system may aggregate user-specific recommendation data from various content providers. The first media recommendation may be identified in, or selected from, the aggregated recommendation data, and the recommendation system will then determine that the first media recommendation is be associated with a first media asset. For example, the first media recommendation may be a recommendation of a particular movie, TV show, TV series, user-generated media clip, or song.

In some embodiments, the recommendation system receives a second indication that a second media recommendation was generated by a second content provider. The second media recommendation may be selected from the aggregated data for comparison with the first media recommendation. The recommendation system then determines whether the second media recommendation is also associated with the same media asset. For example, the recommendation system may compare metadata of each of the recommendations to determine if they refer to the same media asset by title. The determination that both the first and second media recommendations are both associated with the same media asset even if each recommendation specifically refers to different formats or versions of the media asset.

In some embodiments, once the recommendation system determines that both the first and second media recommendations are associated with the first media asset, the recommendation system may generate a "combined" recommendation of the first media asset representing the first and second media recommendations. The combined recommendation may be transmitted to a device of the user for display, and provide the user with an option to view the first media asset. For example, if the first media asset is a movie, the user may receive a recommendation to watch the movie and may have the option of downloading or streaming the movie from a content provider. The combined recommendation may also contain information on which content providers recommended the media asset to the user.

In some embodiments, the various content providers available to the user may have associated importance values either assigned by the user or automatically designated by the recommendation system. When determining whether a recommendation should be generated for a particular media asset, the recommendation system may "score" recommendations based on the importance values associated with their respective content providers. For example, once it is determined that a first and second media recommendation are associated with a first media asset, the importance values from a first content provider (that generated the first media recommendation) and a second content provider (that generated the second media recommendation) may be added together. The sum of the importance values may then be compared to a threshold value. If the sum is greater than or equal to the threshold, a recommendation of that media asset may be generated by the recommendation system.

In some embodiments, the media recommendations may be generated based on the frequency of which a media asset has been recommended to a user. The recommendation system may identify a particular media asset, for example, by determining that a first content provider and a second content provider both recommended the media asset. The recommendation system may then tally the number of times the media asset has been recommended by other content providers. A media asset with the highest frequency of recommendation may then be recommended to the user by the recommendation system. The recommendation system may also generate a list of media assets in which the media assets are ranked based on their frequencies of recommendation. The order in which media assets are recommended to the user by the recommendation system may also be based on the ranked list of media assets.

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 5 shows an illustrative embodiment of a display interface for searching for content and content recommendations in accordance with some embodiments of the disclosure;

DETAILED DESCRIPTION

Figure 1:
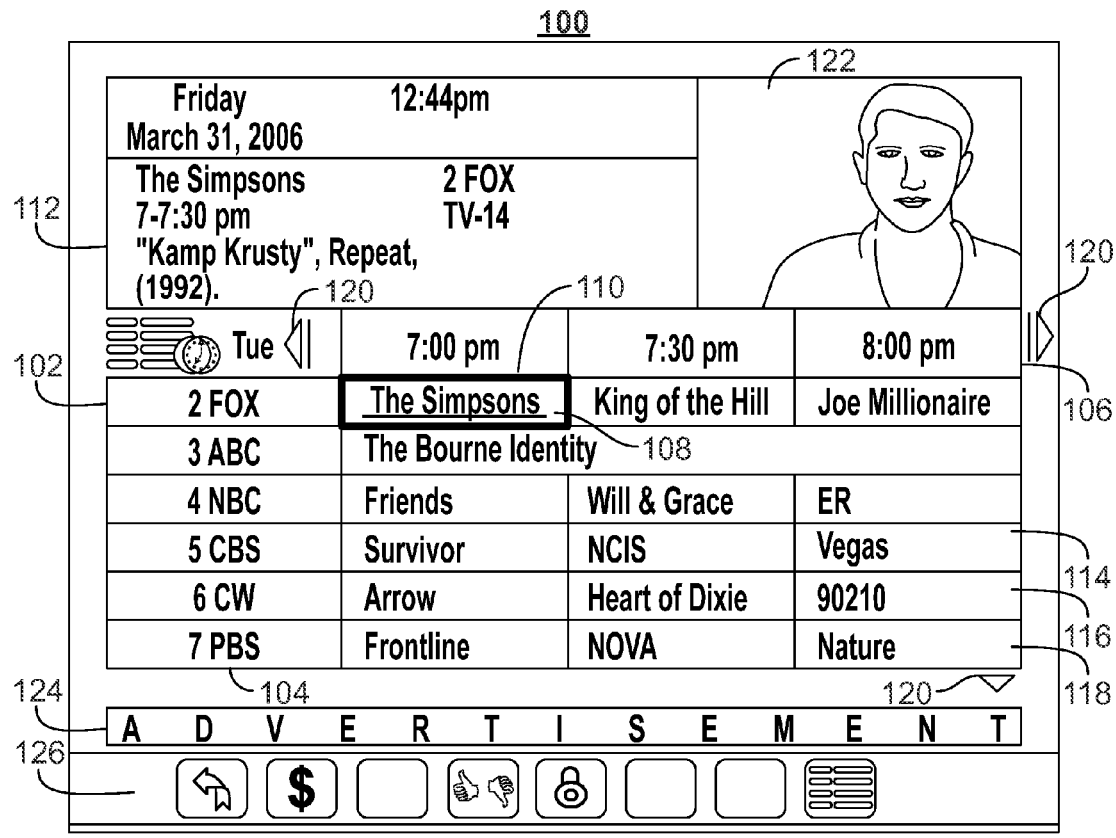
FIG. 1 is a diagram of an interactive grid display in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments described herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
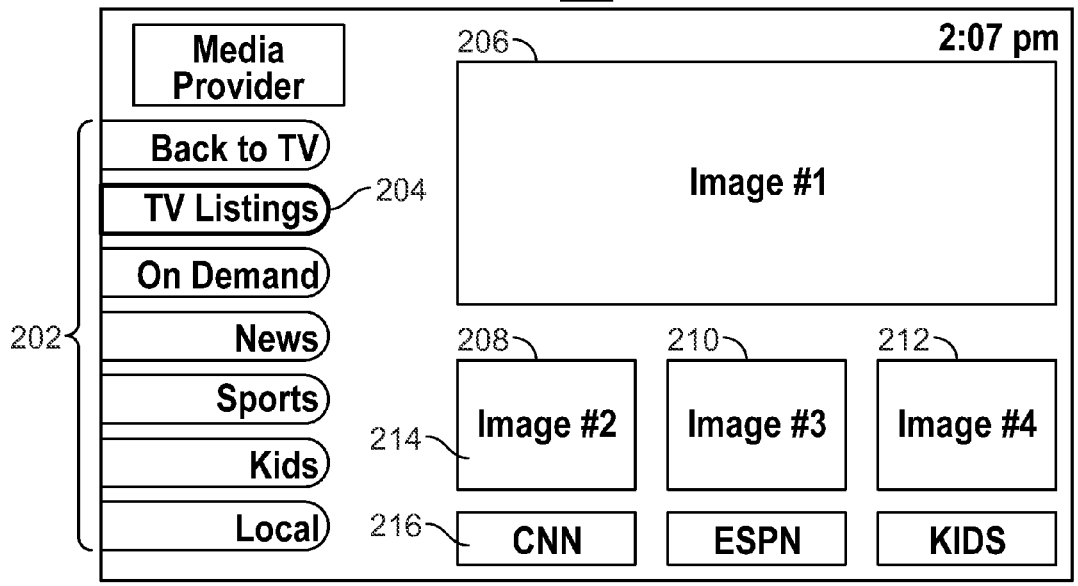
FIG. 2 is a diagram of an interactive media system in accordance with some embodiments of the disclosure.

FIGS. 1-2 show illustrative display screens that may be used to provide media guidance data. The display screens shown in FIGS. 1-2 and 5-10 may be implemented on any suitable user equipment device or platform. While the displays of FIGS. 1-2 and 5-10 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/ preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, media recommendation settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
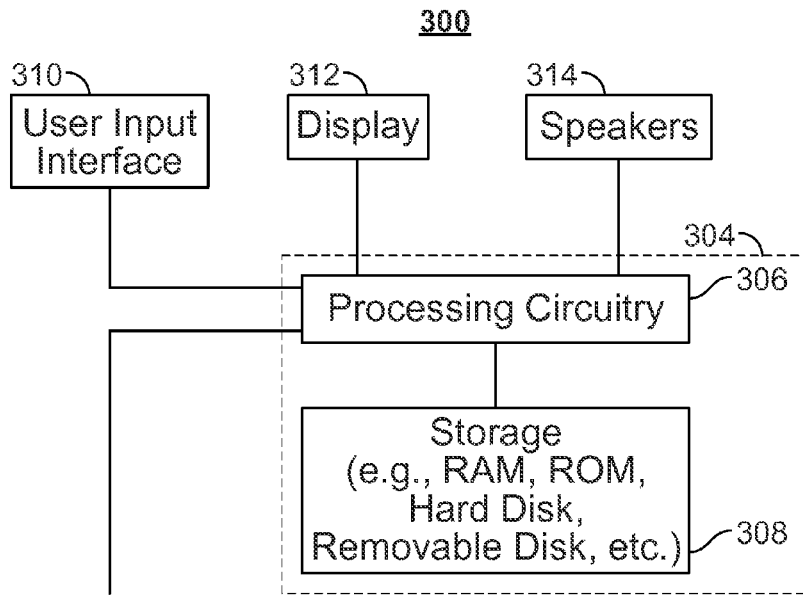
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
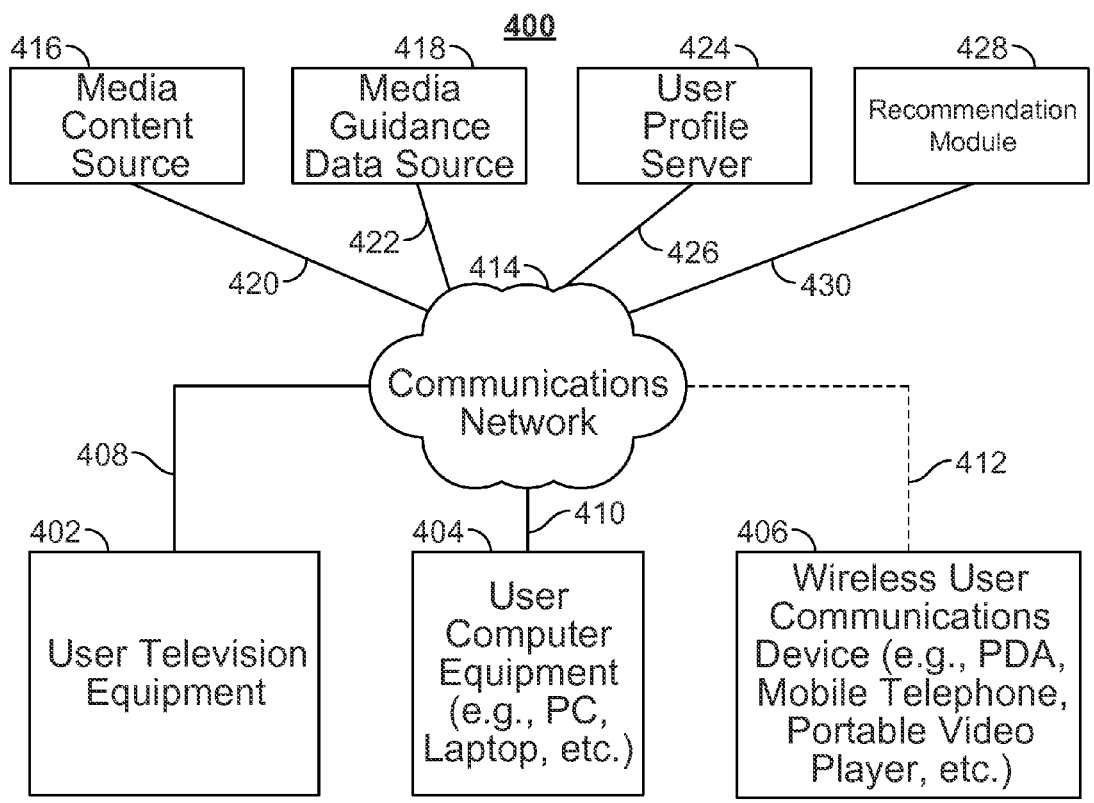
FIG. 4 is a block diagram of an illustrative media system in accordance with some embodiments of the disclosure.

User equipment device 300 of FIG. 3 can be implemented in recommendation system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In recommendation system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

Recommendation system 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. Content source 416 may be any type of media content provider or service provider, and be capable of providing media recommendations to any user equipment device over communications network 414. In addition, there may be more than one of each of content source 416 and media guidance data source 418, but only one of each is shown in FIG. 4 to avoid overcomplicating the drawing. (The different types of each of these sources are discussed below.)

If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

User profile information including user settings, user personalization, user preference, and user media content information may be stored on user equipment devices and/or on user profile server 424. User profile server 424 may be in communication with user equipment devices 402, 404 and 406 through communications path 426 and communications network 414. User profile server 424 may include storage devices for storing user profile information associated with user media networks. User profile server 424 may also include storage devices for storing media content information associated with user media networks including recordings of media content and/or lists of selected media content. User profile server 424 may include processors and communications circuits for managing user profile information, remotely controlling and communicating with user equipment devices, and exchanging user profile information with user equipment devices. Media content source 416 may communicate with user profile service 424 to obtain information on a particular user to which media recommendations may be sent, or may have its own user profile server for maintaining user profile information.

Recommendation module 428 may be a remote server maintained by a particular content or service provider, or may be a user device. Recommendation module 428 may have the same functionality as user equipment device 300, and include user input interface 310, display 312, speakers 314, processing circuitry 306, and storage 308. Recommendation module 428 may be configured to generate a combined recommendation of media content in accordance with any of the embodiments described herein, and may be configured to transmit and receive data from any device within communications network 414 over communications path 430.

In some embodiments, recommendation module 428 may aggregate recommendation data from various media content sources 416, media guidance data sources 418, user profile server 424, and user equipment devices 402, 404, and 406 to generate a recommendation database. Recommendation module 428 may be configured to query content providers directly to obtain relevant information related to user-specific media recommendations. For example, recommendation module 428 may be configured to retrieve and store login information, IP addresses, and uniform resource locators that can enable recommendation module 428 to directly query a content provider for user-specific data or locate user-specific data associated with the content provider. The recommendation database may contain data on any media recommendations generated for a particular user. In some embodiments, recommendation module 428 may analyze the aggregated data, using processing circuitry 306, to identify specific media assets for which recommendations have been made. While recommendation module 428 is depicted as a stand-alone device in FIG. 4, recommendation module 428 may be a user equipment device, such as a set-top box, portable device, or any device configured to receive and/or play back media content, and may operate in accordance with any of the embodiments described herein.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Recommendation system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

An interactive television program guide having various interactive television program guide interface screens may be provided to assist a user in selecting television programs, and may be implemented on user equipment device 300. Examples of the various interactive television program guide interface screens are described, for example, in Ellis U.S. patent application Ser. No. 10/306,175, filed Nov. 25, 2002, which is hereby incorporated by reference herein in its entirety. As the number of available television programs grows, it becomes increasingly more confusing and burdensome for a user to select television programs that are of interest to the user. One approach to mitigate this problem is for an interactive television program guide application to suggest television programs to a user that may be of interest. For example, the interactive television program guide application may suggest television programs to the user based on the user's previous television viewing habits. The interactive television program guide application may derive the user's viewing habits by, for example, identifying and categorizing those television programs towards which the user has shown interest.

Numerous content providers, including YOUTUBE, NETFLIX, and HULU, have developed recommendation engines for reducing the time involved in finding content of interest to particular users. Recommendations of content are then provided to the viewer through a suitable interface, such as software running on a user's personal set-top box or a website. However, a downside to such recommendation systems is that they are managed in isolation, and only have access to limited information on a user's activity. For example, a particular user whose overall activity is divided up across five different content providers may receive inaccurate recommendations from each of the five due to the limited information that each of the five recommendation engines has access to. In such cases, ineffective analytics of monitored user activity may result in wildly varying recommendations from each of the content providers.

To mitigate this piecemeal knowledge of a particular user's preferences, recommendations from multiple sources of content recommendations and recommendation analytics may be consolidated within a combined recommendation system. The combined recommendation system may aggregate media recommendations from various content providers and generate new recommendations of media content based on various factors, including the sources from which the original recommendations came, a user's preferences for particular content providers, and the frequency of which particular media content has been recommended previously.

It should be understood that the term "content provider" refers to any third-party provider, advertiser, distributor, or generator of media content that is capable of generating, providing, or relaying user-specific recommendations, reviews, web addresses, and advertisements of media content. Examples of content providers include, but are not limited to, subscription services, social networking websites, and targeted advertisement services. The consumer of media content may receive the media content from the content provider through various channels, including, but not limited to, a subscription service, a website, a television broadcast, and a mail delivery service. Content providers may utilize recommendation engines to direct the consumer's attention to particular media assets and particular types of media content. It should be understood that the term "recommendation engine" is any type of system that identifies a potential interest, choice, or course of action of a particular individual based on knowledge of that individual acquired from previous actions performed by that individual, other individuals of similar interests or backgrounds, or combinations thereof. In the context of media recommendations, a recommendation engine is generally a system that provides recommendations of media content to a particular user, generally by evaluating the user's activity and storing this information electronically as a user profile.

FIG. 5 shows an illustrative embodiment of a display interface for searching for content and content recommendations in accordance with some embodiments of the disclosure. In some embodiments, display 500 may be generated for display on user equipment device 300 using control circuitry 304. For example, display 500 may be sourced from user equipment device 300, or may be sourced from a website and generated on user equipment device 300. Display 500 includes indication 502 which indicates to a user that the user has the opportunity to search for media content.

Display 500 displays advertisement 504, which may be an advertisement related to a particular content provider (for example, the content provider associated with display 500 and its functionality). Advertisement 504 may also be a targeted advertisement based on a user profile of the user, or may be based on a search string previously entered by the user. Using user input interface 310, the user may enter a search string into search box 506. Selection of search option 508 may transmit the search string to an associated content provider or to recommendation system 400. In some embodiments, search results may be generated for display in display 500, for example, underneath search option 508 or in a new window. In some embodiments, advertisement 504 may be replaced with an advertisement related to the entered search string. In some embodiments, advertisement 504 may be a recommendation provided in the form of an advertisement generated by recommendation system 400, and generated in response to any of the actions described above.

In some embodiments, the user may not necessarily search for content directly. Display 500 may also be configured as a general search interface. For example, the user may use display 500 to search any suitable file, media asset, or other data stored locally on user equipment device 300 or stored on other devices accessible to the user through communications network 414. As another example, display 500 may be implemented as a website for performing a search of the Internet.

Recommendation system 400 may analyze the user-entered search results using recommendation module 428 and generate a recommendation based on previous recommendations generated for the user by various content providers, as will be described in more detail below.

In some embodiments, the user may be able to opt for automatically generated recommendations. Display 500 provides the user with recommendation option 510, which may automatically generate a recommendation of content to the user by combining recommendations from content providers. For example, in response to the user selecting recommendation option 510 from user input interface 310, recommendation system 400 may identify a particular media asset for recommendation to the user. Using recommendation module 428, recommendation system 400 may analyze data that is indicative of recommendations that have been or will be provided to the user by at least one content provider. In some embodiments, recommendation system 400 may aggregate metadata associated with recommendations generated by content providers (and/or recommendation engines associated with content providers) from which the user receives content and content recommendations. The metadata may be sourced directly from the content providers, and may also be sourced from user equipment device 300 or other storage devices accessible to the user through communications network 414.

Recommendation module 428 analyzes the aggregated metadata to identify indications of media recommendations and their respective content providers. In some embodiments, recommendation module 428 may identify particular media assets that have been frequently recommended to the user by the various content providers, and may generate recommendations of these media assets using any of the suitable approaches discussed below. In some embodiments, recommendation module 428 may identify a particular media asset, for example, based on user profile information stored at recommendation module 428 or based on a search string entered by the user at display 500, as discussed above.

Recommendation module 428 may then analyze the aggregated metadata to identify a first media recommendation from a first content provider that is associated with the media asset. For example, the media asset may be the movie "No Country for Old Men," and it may have been recommended to the user by NETFLIX. Recommendation module 428 may then search through the metadata to compare the media recommendation associated with the first media asset to other media recommendations. Once recommendation module 428 identifies a second media recommendation, recommendation module 428 will then determine if the second media recommendation is also associated with the media asset. For example, the second media recommendation may be a recommendation from HULU to watch "No Country for Old Men", a clip or trailer of "No Country for Old Men", an interview with an actor discussing his/her role in "No Country for Old Men", or any other media asset for which a reasonable association can be drawn. In general, to avoid poor or loose associations, recommendation module 428 may determine that the second media recommendation is associated with the first media asset by comparing metadata of the media asset, or the first media recommendation from the first content provider, to metadata of the second media recommendation. In some embodiments, the association between the second media recommendation and the media asset may be determined editorially or may be predefined.

Once it is determined that the second media recommendation is associated with the media asset, recommendation system 400 may then generate a recommendation of the media content to the user using any suitable method disclosed herein. For example, the recommendation generated by recommendation system 400 may be provided to the user through display 500 in the form of advertisement 504, or included within search results in response to a user-entered search. In some embodiments, recommendation module 428 may determine that the second media recommendation is not associated with the media asset. In such situations, recommendation system 400 may forego recommending the media asset to the user altogether, continue analyzing metadata to determine if the media asset is recommended by another content provider, or may recommend the media asset anyway because the first content provider associated with the first media recommendation of the media asset was designated as a preferred content provider.

Figure 6A:
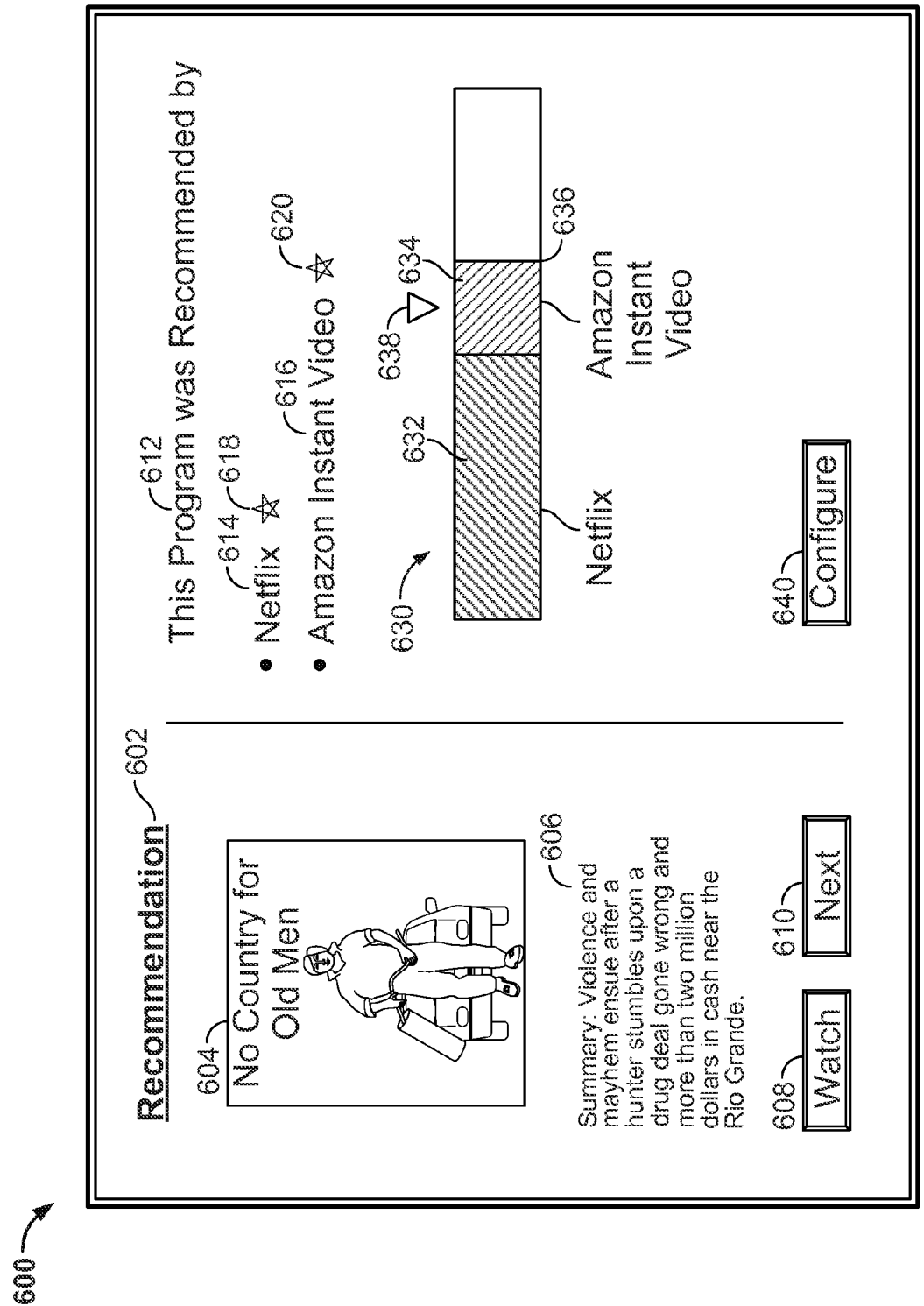
FIGS. 6A and 6B show an illustrative embodiment of a combined recommendation display interface in accordance with some embodiments of the disclosure.
Figure 6B:
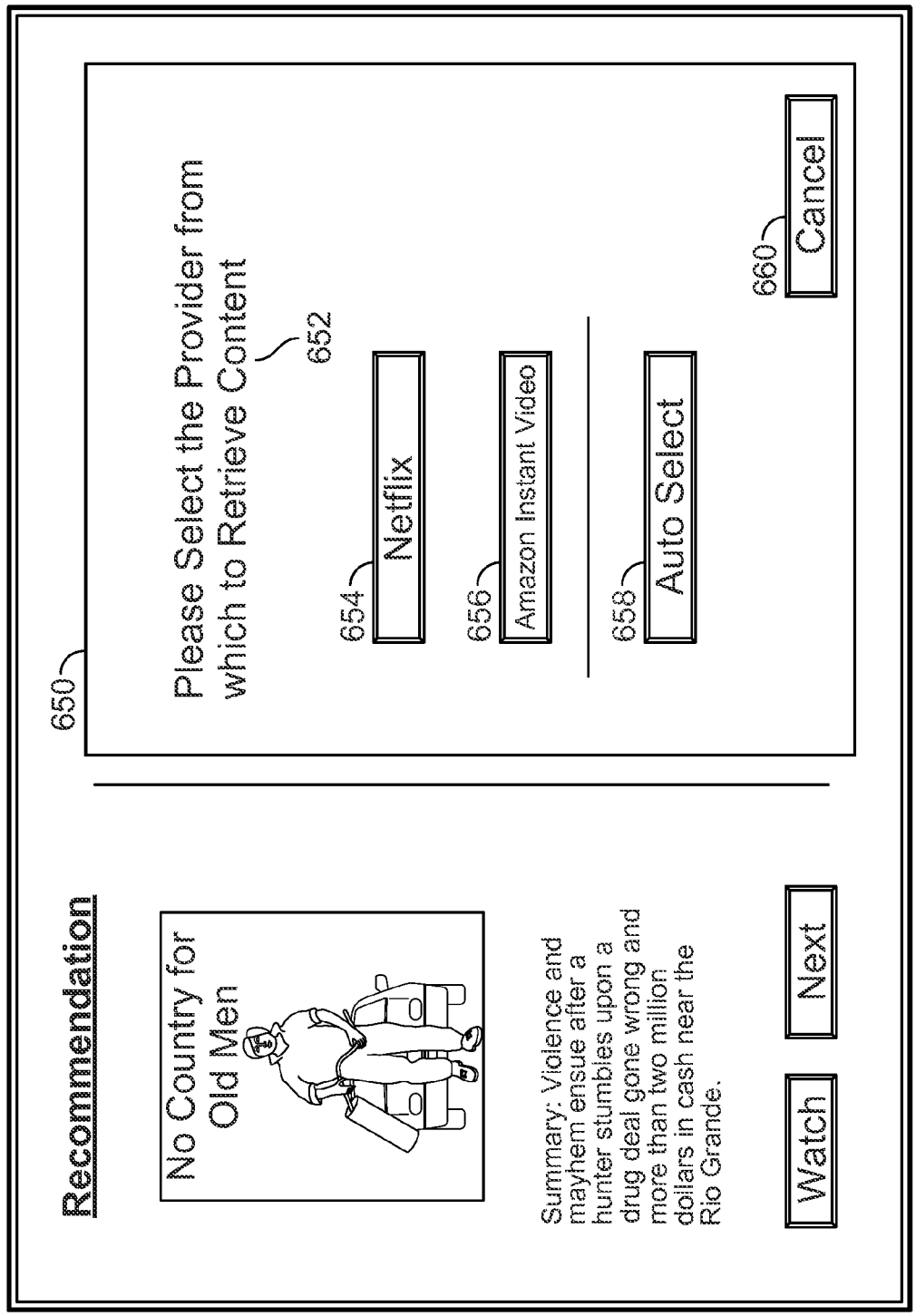

FIGS. 6A and 6B show an illustrative embodiment of a combined recommendation display interface in accordance with some embodiments of the disclosure. In some embodiments, and as shown in FIG. 6A, display 600 may be generated for display on user equipment device 300 using control circuitry 304. Display 600 is divided into a first portion for providing the combined recommendation of a particular media asset and a second portion for providing analytics information and options for configuring how combined recommendations are generated by recommendation system 400. Indicator 602 provides an indication to the user of a particular media asset that is being recommended. Graphic 604 is a graphic associated with the recommended media content. For example, a recommendation of "No Country for Old Men" may use a scene from the movie or a picture of the poster or DVD/BLU-RAY cover art as graphic 604. Alternatively, graphic 604 may be eliminated entirely in favor of a textual indicator of the content, for example, if space is limited on a display screen of user equipment device 300, or if memory for storing graphics is limited. In some embodiments, graphic 604 may be a reduced scale video of scenes from the associated media asset. Description 606 may optionally accompany graphic 604, which describes the media asset.

Display 600 provides the user with option 608 to watch the content. For example, if the user selects option 608 with user input interface 310, the media asset will begin playing. For example, video from the media asset may replace display 600 entirely, may be played from a remote user equipment device, or may be played in a reduced-scale window within display 600. In some embodiments, the media asset may be sourced directly from a content provider for which the user is capable of receiving content from. In some embodiments, the media asset may be sourced from a content provider that has been designated as a preferred content provider, as will be discussed below with respect to FIG. 6B. If the user decides that he/she is not interested in the content, the user may select option 610 with user input interface 310 to receive at user equipment device 300 an alternative recommendation, which may be generated in accordance with any of the embodiments described herein.

Indicator 612 provides the user with an indication of which content providers were utilized in generating a combined recommendation of the media asset indicated in display 500. For example, content providers 614 and 616 were identified by recommendation module 428 as both having recommended "No Country for Old Men". In some embodiments, indicators 618 and 620 may be included which indicate that content providers 614 and 616 were designated as preferred content providers. For example, a user may have designated both HULU and NETFLIX as preferred content providers. In some embodiments, recommendation module 428 may have determined from monitored user profile activity that HULU and NETFLIX are preferred content providers by, for example, determining that the user accesses both of these content providers or requests content from both of these content providers more frequently than other content providers. In some embodiments, indicators 614 and 616 may take other forms, such as a shape or text, or may take the form of highlighting the names of content providers 618 and 620, or may be any suitable combination thereof.

In some embodiments, recommendation meter 630 may be included in display 600. Recommendation meter 630 provides the user with analytic information generated by recommendation module 428 regarding the combined recommendation. For example, each of content providers 614 and 616 may have an associated importance value assigned by recommendation module 428. The importance value may be, for example, a numerical value within a range of 1 to 100. Importance values may be assigned by the user or may be automatically determined by recommendation module 428. In the case of the former, a user may specify an importance value for a particular content provider, which may be stored locally at user equipment 300, with any suitable device of recommendation system 400, or both. If the user selects option 640, a separate interface may be generated for display by processing circuitry 306 for which user input interface 310 may be used to designate an importance value. For example, the user may particularly favor NETFLIX, and may assign a value of 60 to NETFLIX, while only assigning a value of 10 to AMAZON INSTANT VIDEO. In some embodiments, importance values may be generated automatically by recommendation module 428. Designation of importance values, including manual and automatic designation, will be discussed below in greater detail.

Importance values may be illustrated graphically by visual indicators 632 and 634, which may be displayed within recommendation meter 630. In some embodiments, visual indicators 632 and 634 may be displayed in an adjacent configuration, with the location of border 636 within recommendation meter 630 being indicative of a combined importance value, which may be, for example, a sum of the importance values represented by visual indicators 632 and 634. In some embodiments, processing circuitry 306 may generate for display recommendation meter 630 as a pie chart, a line graph, or any other suitable graphical display or combination thereof.

Threshold indicator 638 may also be displayed in display 600. Threshold indicator 638 may take the form of an arrow that depicts the minimum requirements for which a combined recommendation is to be generated, in connection with some embodiments. Threshold indicator 638 may also be depicted as any other suitable shape, or may be displayed within recommendation meter 630 as a dotted line, a bold line, a glowing line, or any other suitable indicator. In some embodiments, threshold indicator 638 is associated with a threshold importance value that the combined importance value must exceed for a combined recommendation of the media asset to be generated by recommendation module 428. The location of threshold indicator 638 may be automatically determined by recommendation system 400, or may be manually adjusted by the user. For example, threshold indicator 638 may be manually adjustable in response to a click-and-drag function in which the user, using user input interface 310, clicks and drags threshold indicator 638 along the length of recommendation meter 630. In some embodiments, a user selection of option 640 will provide the user with additional options and configurations settings for configuring recommendation system 400, as will be discussed below with respect to FIGS. 8-10.

In some embodiments, a user selection of option 608 indicating that the user wishes to watch the recommended program will result a display of window 650 within display 600, as illustrated in FIG. 6B. Window 650 may appear as an overlay in which indicator 652 prompts the user to select a content provider from which to receive the content. For example, options 654 and 656, corresponding to content providers 614 and 616, respectively, may be selectable. In response to a user selection of option 654, the content may begin playing in place of graphic 604, or may span the entire display. In some embodiments, and as depicted in FIG. 4, content provider 614 (as represented by media content source 416) may receive an indication from recommendation module 428 over communications network 414 that the user desires to view the selected content. In such instances, media content source 416 may then transmit the content over communication path 420 to whichever of user equipment devices 402, 404, and 406 requested the content. In some embodiments, the request for content may be transmitted directly from one of user equipment devices 402, 404, and 406 to media content source 416 independent of recommendation module 428. The requesting user equipment device may then generate for display an interactive program guide associated with media content source 416 to display the content. In some embodiments, recommendation module 428 may store the user selection of option 654, which may be used by recommendation module 428 to determine whether content provider 614 is a preferred content provider for future recommendations.

In some embodiments, only content providers used in generating the combined recommendation may be presented as selectable options for retrieving the content in window 650. In some embodiments, only content providers that have been designated as preferred content providers by the user, by recommendation system 400, or by a combination thereof, may be presented as selectable options for retrieving the content in window 650. In some embodiments, any suitable subset of content providers may be presented as selectable options for retrieving the content in window 650, provided that the content is accessible through each of those content providers over communications network 414. In response to a user selection of option 660, the user may opt out of viewing the recommended content and window 650 will disappear.

Window 650 also provides a user with option 658 to auto-select a content provider from which to retrieve the recommended content. In some embodiments, recommendation system 400 will automatically choose the content provider based on stored data indicative that the content provider is a preferred content provider. In some embodiments, recommendation system 400 will randomly select a content provider. In some embodiments, recommendation system 400 will query one or more of the available content providers to determine if the content is accessible at the time of selection, and may select the first content provider that responds. In some embodiments, recommendation system 400 may query some or all of the available content providers to determine which content provider is capable of transmitting the content to a requesting user equipment device at the fastest rate and select that content provider. In some embodiments, recommendation system 400 may select a content provider based on aspects of the user equipment device that is requesting the content. For example, if user equipment device 412 is a mobile device that is requesting the content, recommendation system 400 may select a content provider that has a particular format of the content that is most compatible with or most suitable for presentation on user equipment device 412. In any of the aforementioned embodiments for automatically selecting the content provider from which to retrieve the content, recommendation module 428 may retrieve user profile or device profile information from the requesting device itself or from user profile server 424, and compare this information to information received from the content providers.

Figure 7:
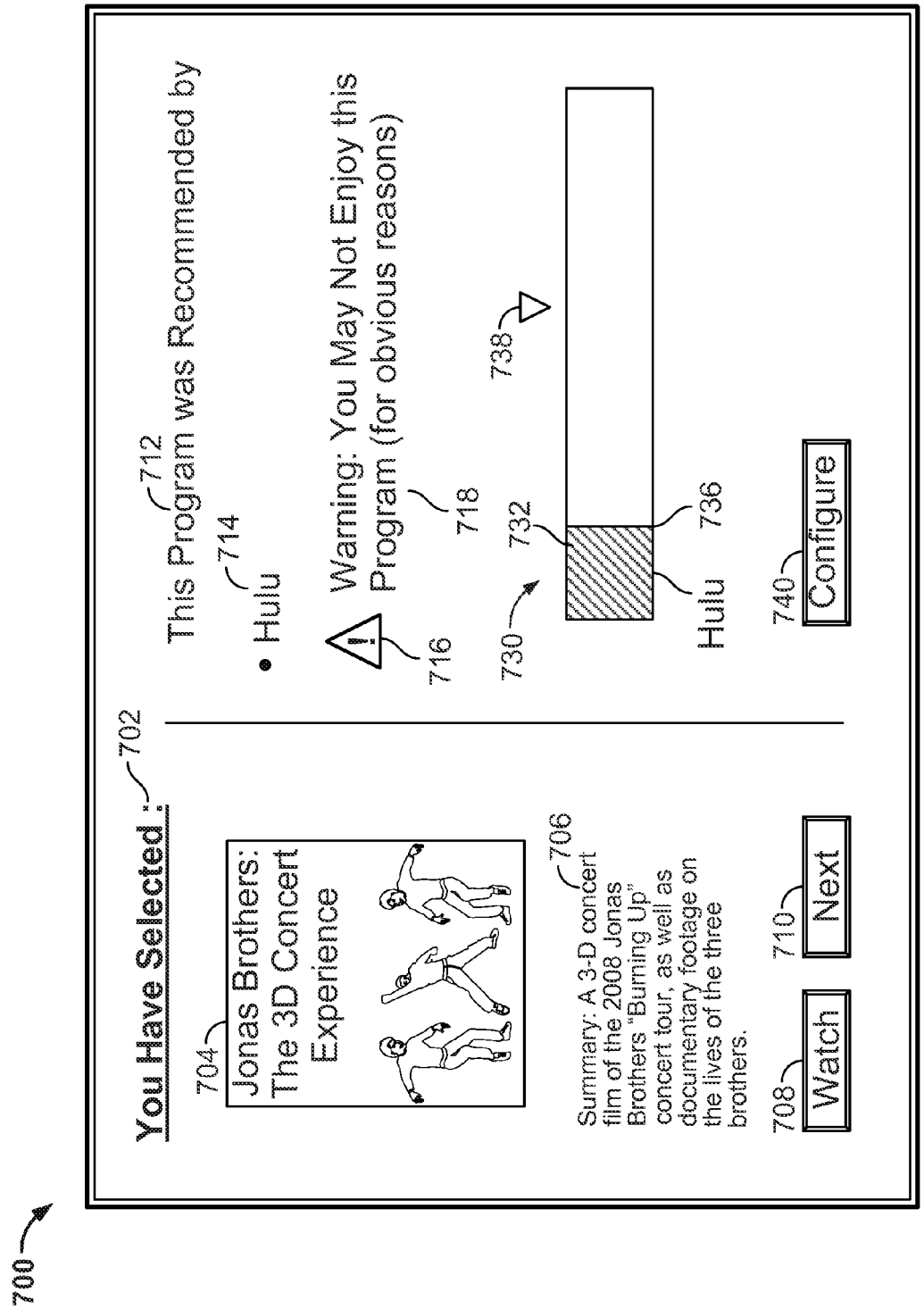
FIG. 7 shows an illustrative embodiment of a display interface used in warning a user against a particular recommendation in accordance with some embodiments of the disclosure.

FIG. 7 shows an illustrative embodiment of a display interface used in warning a user against a particular recommendation in accordance with some embodiments of the disclosure. In some embodiments, display 700 may be generated for display on user equipment device 300 using control circuitry 304. Similar to display 600, display 700 is divided into a first portion for providing information on a particular media asset and a second portion for providing analytics information generated by recommendation system 400.

In general, display 700 appears in response to a user selection of media content, for example, from search results retrieved based on a search string entered into search box 506, or in response to selecting an advertisement for the media content. In some embodiments, a user may receive a media recommendation from a content provider or from a friend through a text message or e-mail. For example, recommendation module 428 may recognize in an e-mail, text message, or generated recommendation a title, a logo, or any other information capable of being used to identify media content, and identify a media asset associated with the title. Recommendation system 400 may automatically generate display 700 in response to such recommendations, or may be configured to appear as an option next to such recommendations. For example, a user may have received a text message from a friend discussing "Jonas Brothers: The 3D Concert Experience", the text of which may appear as a hyperlink that, when selected, generates display 700.

Indicator 702 provides an indication to the user that a particular media asset was selected by the user. Graphic 704 is a graphic associated with the recommended media content. For example, if the selected media content or current content of interest is "Jonas Brothers: The 3D Concert Experience", a scene from the movie or a picture of the poster or DVD/BLU-RAY cover art as graphic 704. Description 706 may optionally accompany graphic 704, which describes the media asset. Display 700 provides the user with option 708 to watch the content. For example, if the user selects option 708 with user input interface 310, the media asset will begin playing, in accordance with the embodiments described with respect to FIGS. 6A and 6B. If the user decides that he/she is not interested in the content, the user may select option 710 with user input interface 310 to receive at user equipment device 300 a recommendation of alternative media content identified by any of the suitable methods described herein.

Indicator 712 may indicate to the user that the content was recommended by content providers. For example, for the current media content, content provider 714 is the sole recommender. Recommendation meter 730 may provide analytic information generated by recommendation module 428 regarding the current media content. Content provider 714 may have an associated importance value assigned by recommendation module 428, which is represented by visual indicator 732 with the location of border 736 within recommendation meter 730 being indicative of the associated importance value. Threshold indicator 738 may also be displayed in display 700, in any suitable fashion as described with respect to FIG. 6A. In some embodiments, a user selection of option 740 will provide the user with additional options and configurations settings for configuring recommendation system 400, as will be discussed below with respect to FIGS. 8-10.

As depicted in FIG. 7, "Jonas Brothers: The 3D Concert Experience" was only recommended by Hulu, and the importance value associated with Hulu does not exceed a threshold value associated with threshold indicator 738. In such situations, warning indicator 716 and warning message 718 may be displayed. Warning message 718 may indicate to the user that the user may not enjoy watching the selected media content, thereby enabling the user to make informed decisions regarding the content.

Figure 8:
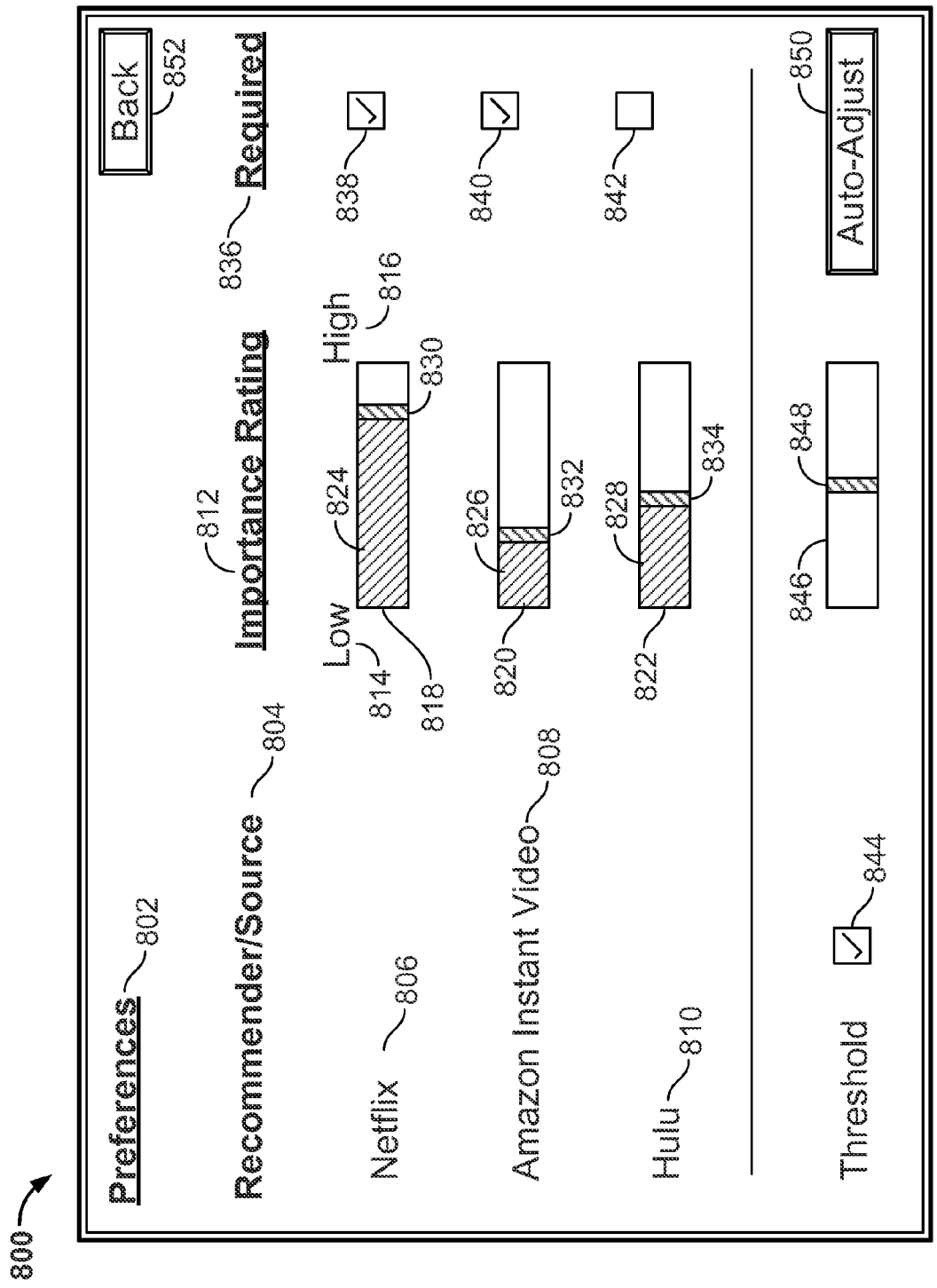
FIG. 8 shows an illustrative preferences interface for adjusting how recommendations are made to a user in accordance with some embodiments of the disclosure.

FIG. 8 shows an illustrative preferences interface for adjusting how recommendations are made to a user in accordance with some embodiments of the disclosure. In some embodiments, display 800 may be a preference screen as indicated by indicator 802, and may be generated for display on user equipment device 300 using control circuitry 304 in response to a user selection of options 640 and 740 from displays 600 and 700, respectively. The user may return to a previous display screen by selecting option 850. Available content providers 806, 808, and 810 may be listed under indicator 804, which indicates the available recommenders and sources of content.

Importance ratings may be assigned for each of the content providers. For example, rating bars 818, 820, and 822 correspond to content providers 806, 808, and 810, respectively, and be arranged under indicator 812. A measure of the assigned importance value may be indicated for each of content providers 806, 808, and 810, respectively, by 824, 826, and 828. Each of rating bars 818, 820, and 822 may have adjustable sliders 830, 832, and 834, respectively, for allowing the user to adjust, using user input interface 310, the assigned importance values of content providers 806, 808, and 810, respectively. Indicators 814 and 816 may provide the user with a relative measure of the value of the importance value on a "low-to-high" scale. However, any suitable method may be used to provide the user with an indication of the assigned importance value, such as a slider configuration, bar graph, number, color, textual indicator, or any suitable combination thereof.

Indicator 837 indicates whether or not a particular content provider is required in generating a combined recommendation. Checkboxes 838, 840, and 842 may be arranged under indicator 837 and correspond to content providers 806, 808, and 810, respectively. For example, checkboxes 838 and 840 are checked, indicating that content providers NETFLIX and AMAZON INSTANT VIDEO must both independently recommend a particular media asset to the user in order for a combined recommendation of that media asset to be generated. As another example, suppose that "No Country for Old Men" was recommended by NETFLIX and AMAZON INSTANT VIDEO, as illustrated in FIG. 6A. In this situation, "No Country for Old Men" would be recommended because NETFLIX and AMAZON INSTANT VIDEO were both indicated as being required, in accordance with FIG. 8, and the combined importance value of both of these content providers exceeded the threshold value. However, if HULU was also indicated as being a required, for example, in response to the user selecting checkbox 842, no recommendation of "No Country for Old Men" would have been generated by recommendation module 428 because HULU did not recommend this content to the user, despite the combined importance value exceeding the threshold value.

In some embodiments, the user may manually adjust the threshold, using user input interface 310, by adjusting the position of slider 848 within adjustment window 846. Selection of option 850 may result in recommendation module 428 automatically adjusting any of the adjustable options within window 800. Once the new values are assigned, recommendation module 428 may transmit this updated information to user equipment device 300 for storage, and processing circuitry 306 may then update display 800 automatically.

In some embodiments, recommendation module 428 may retrieve user profile information from user equipment device 300, user profile server 424, media content source 416, or all three. Recommendation module 424 may determine a new importance value for a particular content provider based on a number of successful media recommendations, the number of times the user has logged into or requested content from the content provider, whether the content provider is a preferred content provider, whether the content provider is a paid subscription service, whether the content provider offers multiple formats of content, or any suitable combination thereof.

In some embodiments, recommendation module 428 may automatically assign an importance value to a content provider based on the number of successful media recommendations. The term "successful media recommendations" should be understood to mean any media recommendation generated by a content provider or recommendation engine for a user in which the user has either affirmatively responded to the recommendation by viewing, purchasing, or requesting the recommended content (i.e. "consuming" the media content) or a determination has been made that the user has or will view, purchase, or request the media content recommended by the content provider or recommendation engine. In some embodiments, an indication that the user enjoyed the media content (for example, in the form of a "yes" or "no" indication) may be required in order for the media recommendation to be considered successful.

When automatically assigning an importance value to a content provider based on the number of successful media recommendations, recommendation module 428 may count the number of successful media recommendations, which may be retrieved from user equipment device 300, user profile server 424, media content source 416, or any combination thereof. The importance value may then be computed by dividing the number of successful media recommendations by the total number of media recommendations generated by the content provider. This number may be normalized, for example, to range from 0 to 100, and stored at recommendation module 428 and also on user equipment device 300. The computed importance values for various content providers may be mapped accordingly to rating bars 818, 820, and 822 for display.

In some embodiments, when generating an importance value for a particular content provider, recommendation module 428 may compute the ratio over a specific time duration by considering media recommendations generated by the content provider and successful media recommendations within the time duration. For example, recommendation module 428 may identify media recommendations generated by a content provider over the last week, the last month, the last year, or any suitable time period, and then may compute a ratio of successful media recommendations to total media recommendations accordingly. In this way, content providers can have dynamic importance values, which may reflect their relevance to a user over time. In some embodiments, the time duration may be an arbitrary time period ranging from a first date to a second date. In some embodiments, the time duration may be user designated or may be automatically designated by recommendation module 428.

In some embodiments, recommendation module 428 may also automatically adjust the threshold value in response to a user selection of option 850. For example, recommendation module 428 may determine from user profile information that the user is generally open to most media recommendations, and may accordingly assign a low threshold value. Alternatively, recommendation module 428 may determine from user profile information that the user is generally very selective in accepting media recommendations, and may accordingly assign a high threshold value.

In some embodiments, the user may effectively or entirely eliminate the threshold functionality. In response to receiving a user selection of checkbox 844, recommendation module 428 will eliminate the use of the threshold value in generating combined recommendations. For example, in response to a user unchecking checkbox 844, rating bars 818, 820, and 822 may appear grayed out and unselectable, or may disappear entirely. Combined recommendations may then be made based on whether or not checkboxes 838, 840, and 842 are checked. For example, the user may wish to limit recommendations to content that has been recommended by both NETFLIX and AMAZON INSTANT VIDEO. As another example, the user may wish to receive recommendations for content as long as the content has been recommended by one of the content providers available to the user, which can be achieved by unchecking checkboxes 838, 840, and 842. The user may also effectively eliminate the threshold functionality by adjusting the threshold value to a minimum value.

Figure 9:
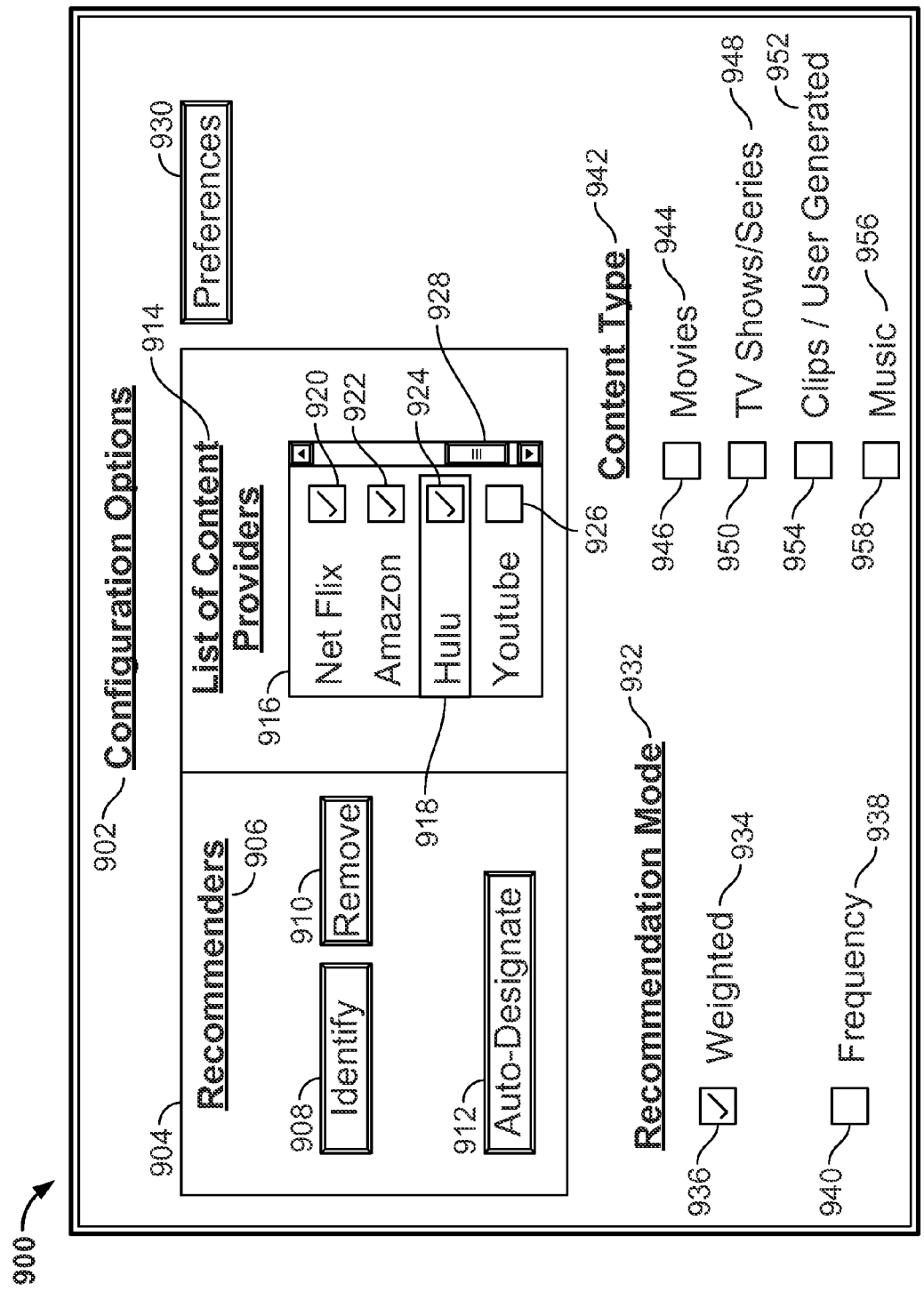
FIG. 9 shows an illustrative configuration interface used for determining sources of recommendations for use in a combined recommendation system in accordance with some embodiments of the disclosure.

FIG. 9 shows an illustrative configuration interface used for determining sources of recommendations for use in a combined recommendation system in accordance with some embodiments of the disclosure. In some embodiments, display 900 may be a configuration screen as indicated by indicator 902, and may be generated for display on user equipment device 300 using control circuitry 304 in response to a user selection of options 640 and 740 from displays 600 and 700, respectively. In some embodiments, display 900 may be an alternative or supplemental display to display 800 in response to the user selection of options 640 and 740.

Region 904 may be used to determine which content providers or recommendation engines are available as recommenders of media content for generating combined recommendations. Indicator 906 indicates high-level options for updating the available content providers. Indicator 914 indicates a list of available content providers from which media recommendations can be received. Using processing circuitry 306, available content providers are generated for display in scrollable list 916. Content providers that are not currently displayed in scrollable list 916 may be viewed by receiving a user input, using user input interface 310, to adjust scrollbar 928. Within scrollable list 916, a user may select content providers, as indicated by selection region 918, and may also select which content providers are to be used in generating combined recommendations. For example, checkboxes 920, 922, and 924 are checked, indicating that combined recommendations will be generated based on recommendations from NETFLIX, AMAZON, and HULU. Checkbox 926 is unchecked, indicating that combined recommendations will be generated without taking YOUTUBE recommendations into account. In some embodiments, content providers corresponding to the checked checkboxes within scrollable list 916 will be reflected in display 800.

In some embodiments, a user selection of option 908 may cause recommendation module 428 to attempt to identify available content providers through communications network 414. In some embodiments, recommendation module 428 may attempt to ping content provider servers through communications network 414 to determine if any of those content providers are available to the user. In some embodiments, recommendation module 428 may identify available content providers by analyzing user profile information to determine which, if any, content providers have sent the user media recommendations. Information on newly identified content providers will be stored at recommendation module 428, and will be transmitted to user device 300. Processing circuitry 306 will then generate for display scrollable list 916 to include all available content providers.

In some embodiments, a user selection of option 910 may cause recommendation module 428 to remove a content provider from the list of available content providers. For example, if option 910 is selected, HULU will be removed from the list as a result of HULU being within selection region 918. Processing circuitry 306 will then generate for display an updated version of scrollable list 916 to reflect the removal of the selected content provider.

In some embodiments, a user selection of option 912 may cause recommendation module 428 to auto-designate which content providers are to be used for generating combined recommendations. Suitable methods for recommendation module 428 to determine whether an available content provider should be include determining that the content provider has generated at least a minimum number of successful media recommendations, the content provider is a paid subscription service, the user has accessed the content provider at least a minimum number of times within a particular time duration, or any suitable combination thereof. Once the auto-designation has been completed and the designations have been stored at recommendation module 428, the updated designations are transmitted to user equipment device 300 and processing circuitry 306 generates for display updated checkboxes within scrollable list 916.

Indicator 932 indicates recommendation modes available for recommendation system 400. Using user input interface 310, the user may check checkboxes 936 and 940, which correspond to weighted mode 934 and frequency mode 938, respectively. The weighted mode is based on the importance values and a threshold for the combined importance value, as described in relation to FIGS. 6-8. The frequency mode is based on the frequency of which particular media content has been recommended, as will be described further in relation to FIG. 11. When either checkbox 936 or checkbox 940 is checked, recommendation system 400 will operate in accordance with the respective mode as described herein. When both checkboxes 936 and 940 are selected, recommendation system 400 will operate in a hybrid mode in which media recommendations are generated for content that satisfies the threshold conditions. However, out of the generated recommendations, those that have been recommended the most will be given priority when generating a display of the recommendation in display 600. When neither of checkboxes 936 and 940 are selected, recommendation system 400 may provide recommendations as generated by individual content providers, or may still provide recommendations based on content providers indicated as being required in accordance with FIG. 8.

Indicator 942 indicates types of content for which combined recommendations may be generating within recommendation system 400. Using user input interface 310, the user may check checkboxes 946, 950, and 954, which correspond to movie mode 944, TV shows/series mode 948, and clips/user generated mode 952, respectively. A selection of any of checkboxes 946, 950, and 954 may enable combined recommendations to be generated for their corresponding modes in accordance with any of the embodiments described herein. Checking checkbox 946 enables recommendation module 428 to generate combined recommendations of movies. Checking checkbox 950 enables recommendation module 428 to generate combined recommendations of individual television show episodes and television series. Checking checkbox 954 enables recommendation module 428 to generate combined recommendations of media clips and user-generated content. A user may set preference options for the various types of content in response to selecting option 930.

Figure 10:
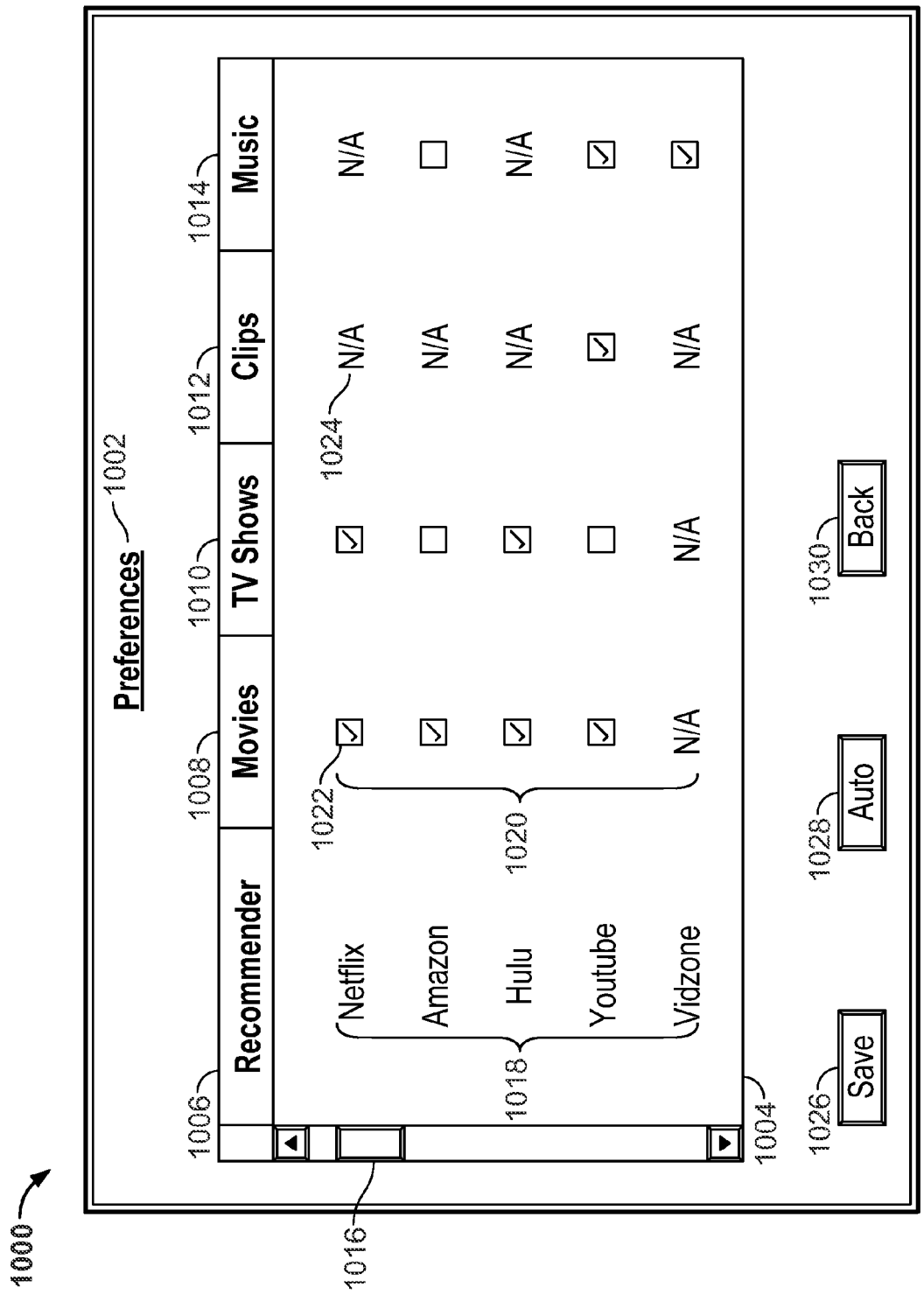
FIG. 10 shows an illustrative preference interface used for choosing sources of recommendations for various types of content in accordance with some embodiments of the disclosure.

FIG. 10 shows an illustrative preference interface used for choosing sources of recommendations for various types of content in accordance with some embodiments of the disclosure. Display 1000 may be a preferences screen as indicated by indicator 1002, and may be generated for display on user equipment device 300 using control circuitry 304 in response to a user selection of option 930 from display 900. Scrollable list 1004 contains a list of content providers 1018 arranged under indicator 1006, and allows a user to scroll to view other content providers using scrollbar 1016. In response to a user selection of option 1026, all changes made in display 1000 may be stored locally at user equipment device 300 and/or transmitted to recommendation module 428. In response to a user selection of option 1028, selections of content providers from which to receive recommendations may be automatically designated by recommendation module 428 using any suitable method described herein. In response to a user selection of option 1030, the user may exit from display 1000 and return to display 900.

For each of content providers 1018, fields 1020 indicate the availability of each content provider for generating combined recommendations of content, and are arranged according to indicators 1008, 1010, 1012, and 1014. Fields 1020 include checkboxes for when a particular content provider is available to generate recommendations of a particular type of content. When a particular content provider is unable to provide recommendations of a particular type of content, indicator 1024 is displayed. In some embodiments, indicator 1024 may be a grayed out, unselectable checkbox. For example, while NETFLIX generates recommendations of movies and TV shows, NETFLIX does not generate recommendations of media clips and movies, and thus cannot be selected to provide recommendations for such media content.

The user may customize how content recommendations are generated for various types of content. For example, the user may believe that NETFLIX provides better movie recommendations than AMAZON INSTANT VIDEO, but may think that AMAZON INSTANT VIDEO provides better TV show recommendations than NETFLIX. In some embodiments, a user selection of any of indicators 1008, 1010, 1012, and 1014 may result in processing circuitry 306 generating a display similar to display 800 so that the user may adjust preference settings for each of the various content types. For example, a user selection of indicator 1014 may result in a display similar to display 800 but for content providers related to music, such as YOUTUBE and VIDZONE as indicated in display 1000. Importance values may be assigned manually or automatically for each content provider associated with the selected content type using any suitable method described herein. Threshold values may also be assigned for each type of content using any suitable method described herein. In addition, importance values and threshold values may be assigned independently for each type of content. For example, a first importance value may be assigned to NETFLIX for movies and a first threshold value may be assigned for movies, and a second importance value may be assigned to NETFLIX for TV shows and a second threshold value may be assigned for TV shows.

Figure 11:
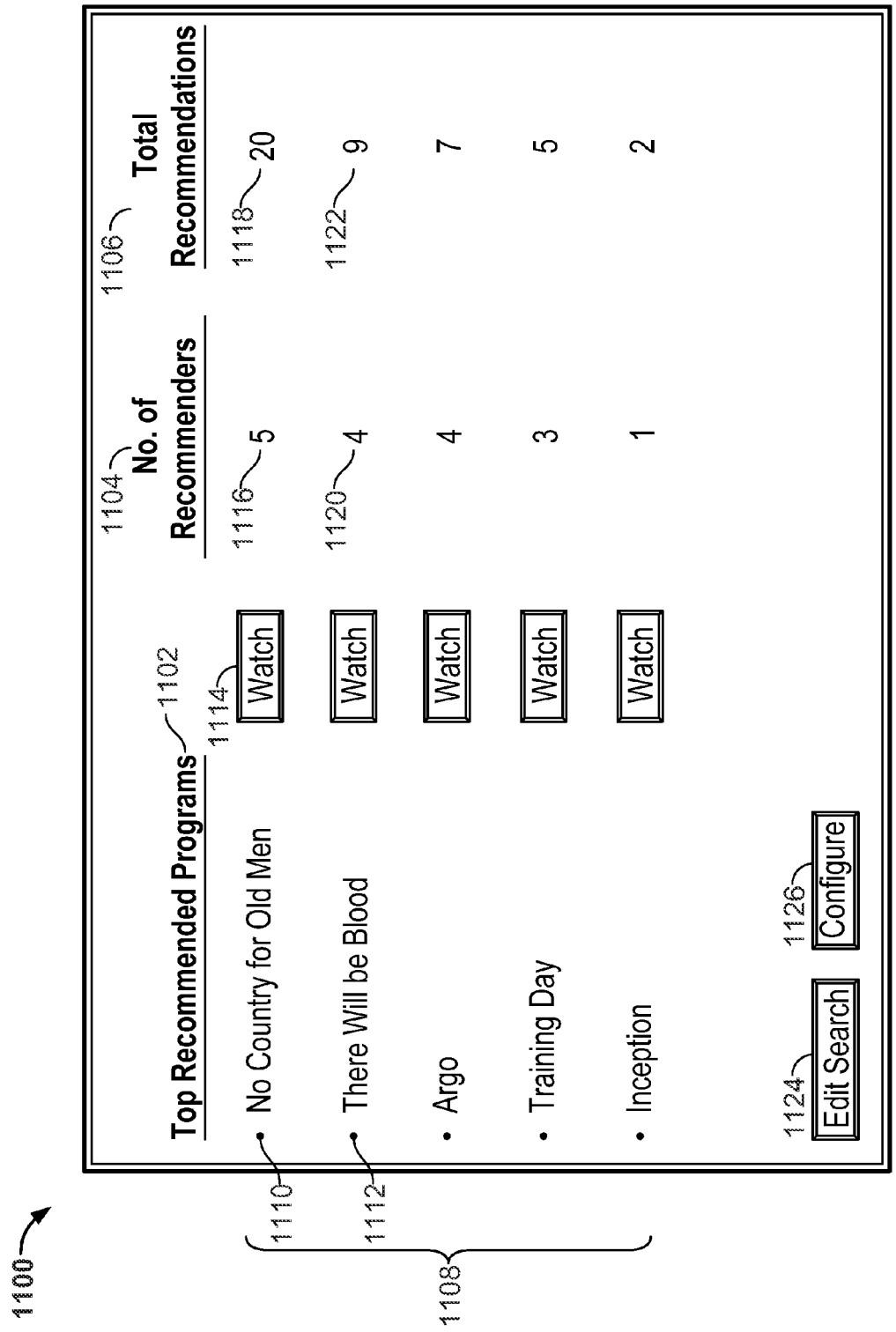
FIG. 11 shows an illustrative list of recommendations organized according to a recommendation frequency in accordance with some embodiments of the disclosure.

FIG. 11 shows an illustrative list of recommendations organized according to a recommendation frequency in accordance with some embodiments of the disclosure. Display 1100 may be generated for display by processing circuitry 306 in response to a user request for media recommendations, and may be displayed as an alternative to displays 600 and 700. In some embodiments, display 1100 may be generated for display in response a user selection of option 508 to search for content.

Processing circuitry 306 generates for display a plurality of media listings 1108 within display 1100 and under indicator 1102, which indicates that the media listings 1108 are top recommended programs. For example, listing 1110 is shown first, indicating that "No Country for Old Men" was ranked the highest, followed by listing 1112 for "There Will Be Blood." The user may select option 1114 to watch media listing 1110, and media content corresponding to listing 1110 may be presented to the user in accordance with any of the embodiments described herein. If display 1100 was generated in response to a search function, the user may select option 1124, and in response processing circuitry 306 may generate for display a search screen, such as display 500 as depicted in FIG. 5, to allow the user to edit his/her search string. The user may also select option 1126 to receive additional options for configuring how recommendation module 428 ranks media content.

Indicator 1104 indicates the number of recommenders that have recommended the displayed media content. For example, values 1116 and 1120 correspond to listings 1110 and 1112, respectively, and indicate that recommendation module 428 identified five content providers that generated media recommendations to the user for "No Country for Old Men", and four content providers that generated media recommendations to the user for "There Will Be Blood." The number of recommenders for each identified media asset may be determined by recommendation module 428 by, for example, analyzing data stored in a recommendation database maintained by recommendation module 428. For example, the database may have an entry for the media asset "No Country for Old Men," and sub-entries that list NET-FLIX and HULU as recommenders (i.e. two recommenders).

Indicator 1106 indicates the total number of recommendations generated for each media asset. For example, values 1118 and 1122 correspond to listings 1110 and 1112, respectively, and indicate that "No Country for Old Men" has been recommended twenty times, and that "There Will Be Blood" has been recommended nine times. Recommendation module 428 may keep track of the number of times each content provider has recommended a particular media asset. This information may be stored in the recommendation database as a sub-entry for a content source listed under a particular media asset entry.

In some embodiments, media listings 1108 may be arranged under indicator 1102 according to the number of recommenders or the total number of recommendations, which may be configured by the user in response to a user selection of option 1126. In some embodiments, an importance value may be computed for each of the media assets based on the number of recommenders or the total number of recommendations, and each importance value may be assigned to a respective media asset based on a frequency of which the media asset was recommended. For example, "No Country for Old Men" may be assigned an importance value of five or twenty, depending on which frequency is used. In some embodiments, the importance value may be weighted based on importance values associated with the content providers that recommended the media asset.

In some embodiments, recommendation module 428 may store data for each of a plurality of media assets in a recommendation database, and may generate recommendations for the user in order of the relative importance of the media asset. For example, "No Country for Old Men" may have the highest importance value, and "There Will Be Blood" may have the next highest importance value, as shown in FIG. 11. In FIG. 6A, "No Country for Old Men" may have been recommended to the user because of its importance value. In response to a user selection of option 610, a media asset with the next highest importance value might be recommended. For example, recommendation module 428 may generate a recommendation of "There Will Be Blood" in response to a user selection of option 608, and the recommendation will be generated for display by processing circuitry 306 in display 600.

FIGS. 12-15 illustrate processes for generating combined recommendations with recommendation module 428 and transmitting the combined recommendations to user equipment device 300.

Figure 12:
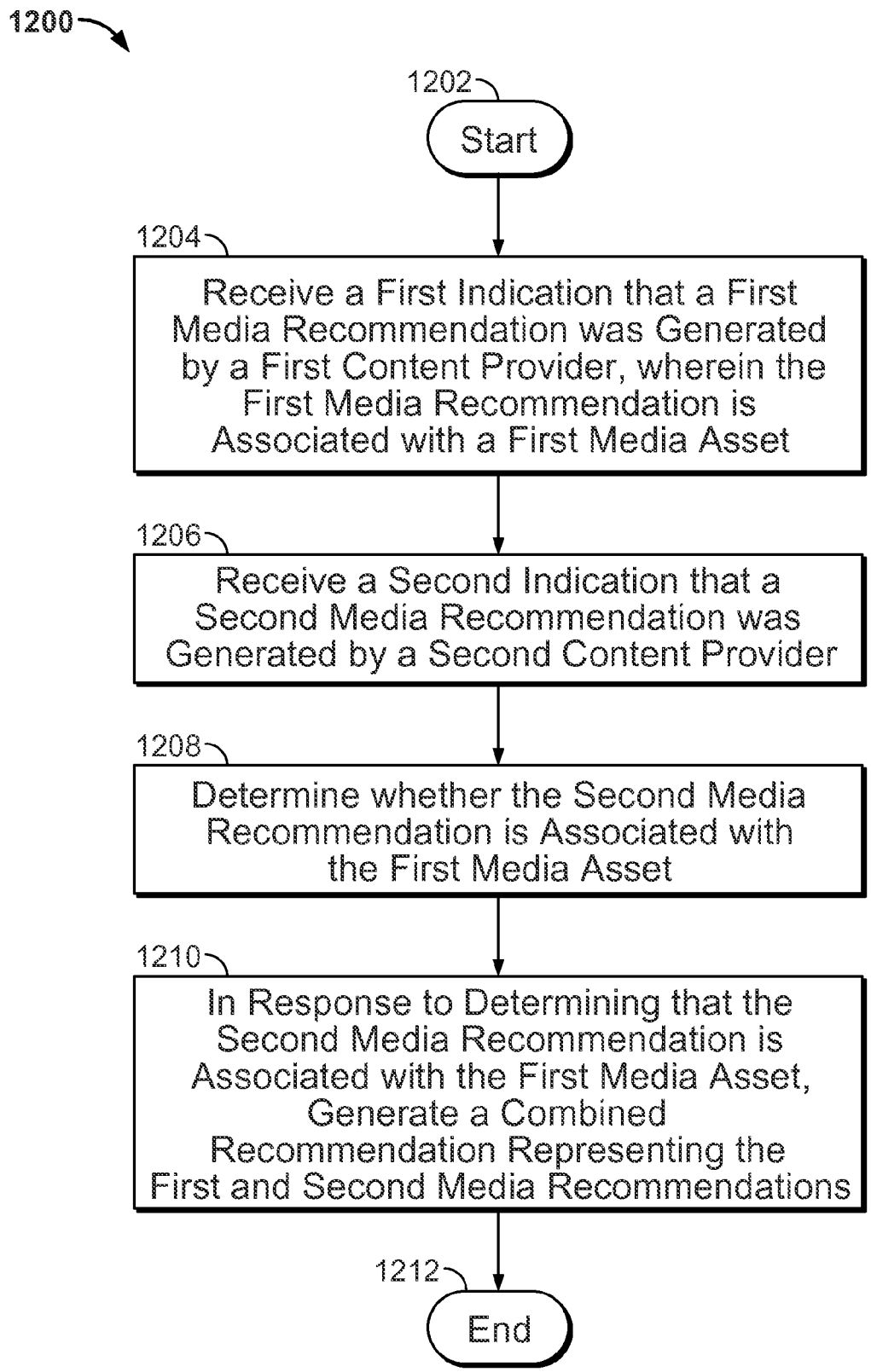
FIG. 12 is a flowchart of the illustrative steps involved in providing combined recommendations in accordance with some embodiments of the disclosure.

FIG. 12 is a flowchart of the illustrative steps involved in providing combined recommendations in accordance with some embodiments of the disclosure. Process 1200 begins at step 1202. At step 1204, recommendation module 428 receives a first indication that a first media recommendation was generated by a first content provider for a user (e.g. media content source 416). Any suitable method may be used to determine that the recommendation was generated by the first content provider, including but not limited to monitoring messages transmitted from media content source 416 to user equipment device 300 over communications network 414, analyzing metadata and/or user profile data stored on any of user equipment device 300, user profile server 424, and media content source 416. In some embodiments, recommendation module 428 may query media content source 416 directly to retrieve a plurality of recommendations generated by media content source 416, and store information on the plurality of recommendations at recommendation module 428. Recommendation module 428 then determines, using processing circuitry, that the first recommendation is associated with a first media asset, for example, by identifying the media asset based on a title contained within information for the first of the plurality of recommendations.

At step 1206, recommendation module 428 receives a second indication that a second media recommendation was generated by a second content provider. Recommendation module 428 may determine that the second media recommendation was generated by a second content provider by aggregating recommendations generated for the user from a plurality of content providers in addition to the first content provider, using any suitable method described herein. In some embodiments, recommendation module 428 may generate and store a database of media assets by analyzing the aggregated recommendation data received from each of the plurality of content providers. Each media asset entry in the database contains information on which content providers recommended the media asset to the user, when the media asset was recommended to the user, whether the user consumed the media asset, and whether the user consumed the media asset in response to a recommendation from a particular content provider.

At step 1208, recommendation module 428 determines whether the second media recommendation is associated with the first media asset. In some embodiments, recommendation module 428 may determine that the second media recommendation is associated with the first media asset by analyzing the database of media assets to determine if a recommendation was generated by at least two content providers for the first media asset using any suitable method described herein. In some embodiments, recommendation module 428 may search through the aggregated recommendation data to identify at least one recommendation that is associated with the first media asset, provided that the identified recommendation is from a content provider other than the first content provider.

At step 1210, recommendation module 428 generates a combined recommendation (i.e. a combined recommendation) representing the first and second media recommendations in response to determining that the second media recommendation is associated with the first media asset. The combined recommendation generated by recommendation module 428 may include information associated with the media asset, such as a title, description, and graphic. Recommendation module 428 then transmits the combined recommendation to user equipment device 300 through communications network 414. User equipment device 300 is configured to generate for display, using processing circuitry 306, the recommendation in accordance with the embodiments described in relation to FIGS. 6 and 11. The process concludes at step 1212, and may repeat continuously starting from step 1202.

Figure 13:
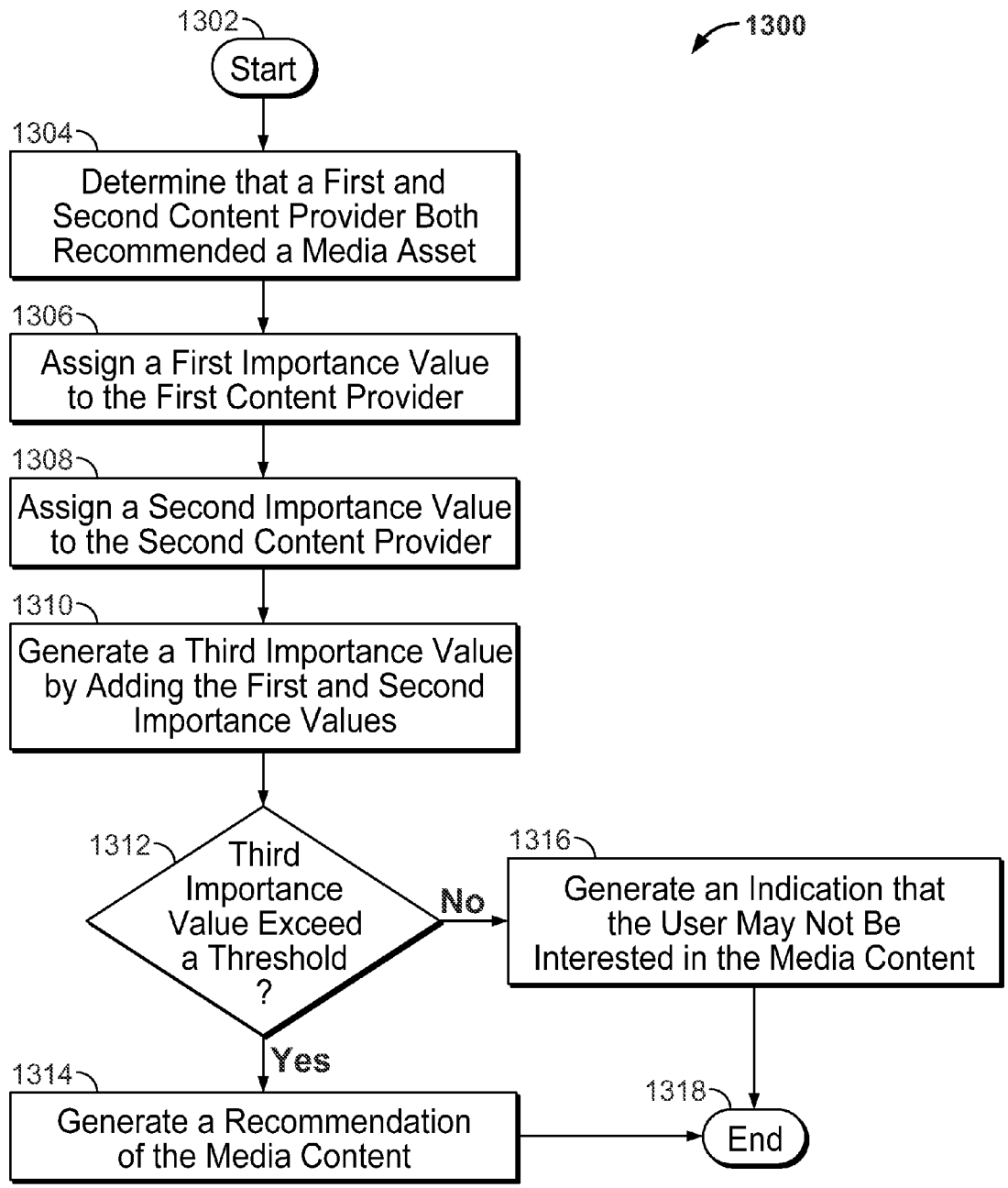
FIG. 13 is a flowchart of the illustrative steps involved in evaluating the importance of a recommendation of a particular media asset in accordance with some embodiments of the disclosure.

FIG. 13 is a flowchart of the illustrative steps involved in evaluating the importance of a recommendation of a particular media asset in accordance with some embodiments of the disclosure. Process 1300 begins at step 1302. At step 1304, recommendation module 428 may determine that a first media asset has been recommended to a user by a first and second content provider, in accordance with process 1200 and any of the embodiments described herein. For example, the media asset may have been previously selected by a user or recommended to the user. In some embodiments, recommendation module 428 receives information on the first media asset through communications network 414, and may identify at least two content providers that have previously generated recommendations of this media asset for the user. In some embodiments, once recommendation module 428 has identified information on the first media asset, recommendation module 428 may proceed to query content providers available to the user through communications network 414 by requesting recommendations associated with the media asset, or querying each of the content providers to determine if the media asset satisfies criteria for which the content provider would generate a recommendation.

At steps 1306 and 1308, recommendation module 428 assigns a first importance value to the first content provider and a second importance value to the second content provider. The first and second importance values may be stored at recommendation module 428, at user equipment device 300, or both. In some embodiments, the user may directly designate the importance values for particular content providers, for example, as described in relation to FIG. 8. The user-designated importance values may be entered using user input interface 310, and subsequently transmitted to recommendation module 428 for storage. In some embodiments, recommendation module 428 may automatically designate the importance values, for example, as described in relation to FIG. 8.

At step 1310, recommendation module 428 generates a third importance value based on the first and second importance values. The third importance value may be computed by processing circuitry of user equipment device 300 or recommendation module 428. In some embodiments, the third importance value is the sum of the first and second importance values, as described in relation to FIG. 8. It is to be understood that any suitable arithmetic operation may be used to compute the third importance value, including multiplying, dividing, and computing a difference of the first and second importance values. In some embodiments, the third importance value may be a function of a plurality of importance values, each related to a particular content provider.

At step 1312, recommendation module 428 determines if the third importance value exceeds a threshold. For example, recommendation module 428 may determine that a sum of the first and second importance value exceeds a threshold value. The threshold value may be manually designated by the user, or automatically designated by recommendation module 428, as described in relation to FIG. 8. It is to be understood that any suitable arithmetic operation may be used to determine whether third importance value satisfies a mathematical criteria, including determining that the third importance value is less than a threshold value, equal to a threshold value, is nonzero, is positive, is negative, or any suitable combination thereof.

If recommendation module 428 determines that the third importance value exceeds or is equal to the threshold value, the process proceeds to step 1314. At step 1314, a recommendation (i.e. a combined recommendation) is generated for the media asset and transmitted to user equipment device 300 in accordance with any of the embodiments described herein. The process concludes at step 1318, and may repeat continuously starting from step 1302.

Alternatively, if recommendation module 428 determines that the third importance value is less than the threshold value, the process proceeds to step 1316. At step 1316, an indication is generated for the media asset and transmitted to user equipment device 300 in accordance with any of the embodiments described herein. The indication may indicate to the user that the user may not be interested in the media asset, which may be transmitted from recommendation module 428 to user equipment device 300 and generated for display by processing circuitry 306 of user equipment device 300. The process concludes at step 1318, and may repeat continuously starting from step 1302.

Figure 14:
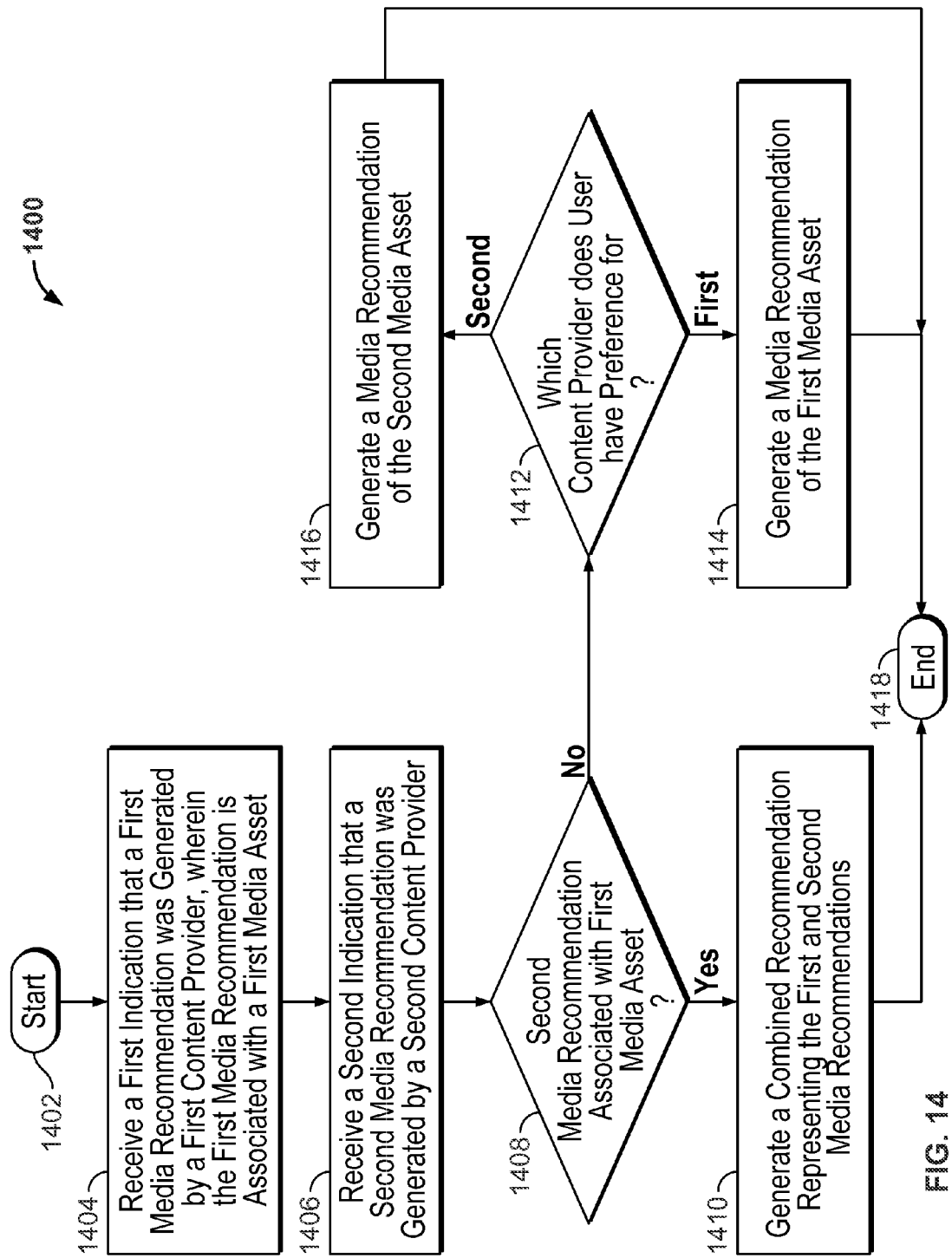
FIG. 14 is a flowchart of the illustrative steps involved in generating a recommendation based on a user preference for a particular content provider in accordance with some embodiments of the disclosure.

FIG. 14 is a flowchart of the illustrative steps involved in generating a recommendation based on a user preference for a particular content provider in accordance with some embodiments of the disclosure. In general, recommendation system 400 may perform process 1400 in situations in which few recommendations have been generated by content providers for the user and/or the user receives recommendations from a small number of content providers. For example, if a recommendation of a media asset has only been recommended by a single content provider, but there is a high likelihood that the user may enjoy the content, recommendation module 428 may generate recommendations anyway based on a user preference for a particular content provider. In some embodiments, process 1400 may be implemented until recommendation module 428 has aggregated an adequate number of recommendations from various content providers in order to effectively generate combined recommendations.

Process 1400 begins at step 1402. Steps 1404, 1406, and 1410 may be performed in a fashion similar to steps 1204, 1206, and 1210, respectively, of process 1200. At step 1408, recommendation module 428 determines whether the second media recommendation is associated with the first media asset. If recommendation module 428 determines this to be true, the process proceeds to step 1410, in which a combined recommendation of the first media asset is generated by recommendation module 428, in accordance with any of the embodiments described herein. The process concludes at step 1418, and may repeat continuously starting from step 1302.

Alternatively, if recommendation module 428 determines that the second media recommendation is not associated with the first media asset, the process proceeds to step 1412. For example, the first media asset may be the movie "No Country for Old Men" and recommendation module 428 may determine that the second media recommendation is a recommendation of "Jonas Brothers: The 3D Movie Experience," which is a different media asset than the first media asset. In some embodiments, recommendation module 428 may make this determination by comparing metadata from stored recommendation data for each of the first and second media recommendations, and determining that a content title for each recommendation is different.

At step 1412, recommendation module 428 may make a determination as to which content provider the user has a greater preference for (i.e. higher preference rating). In some embodiments, the user may manually designate whether he/she has a preference for a particular content provider. For example, using user input interface 310, the user may designate the preference rating as a number that indicates the user's preference for that content provider. In some embodiments, the preference rating is the importance value assigned to the content provider for a particular content type. In some embodiments, recommendation module 424 may automatically designate a preference rating for a particular content provider based on monitored actions taken by the user. For example, recommendation module 424 may analyze stored user profile information to determine a number of successful media recommendations generated by the content provider, the number of times the user has logged into or requested content from the content provider, whether the content provider is a preferred content provider, whether the content provider is a paid subscription service, whether the content provider offers multiple formats of content, or any suitable combination thereof.

If recommendation module 428 determines that the first content provider has a higher preference rating than the second content provider, the process proceeds to step 1414. For example, recommendation module 428 may determine that the first content provider, NETFLIX, which may have recommended "No Country for Old Men," has a higher preference rating than the second content provider, HULU, which may have recommended "Jonas Brothers: The 3D Concert Experience." Accordingly, recommendation module 428 will then generate a combined recommendation of the first media content associated with the first media recommendation (e.g. "No Country for Old Men" from NETFLIX). Alternatively, if recommendation module 428 determines that the alternative is true, recommendation module 428 will then proceed to step 1416 and generate a recommendation of the second media asset (e.g. "Jonas Brothers: The 3D Concert Experience"). The process concludes at step 1418, and may repeat continuously starting from step 1402.

Figure 15:
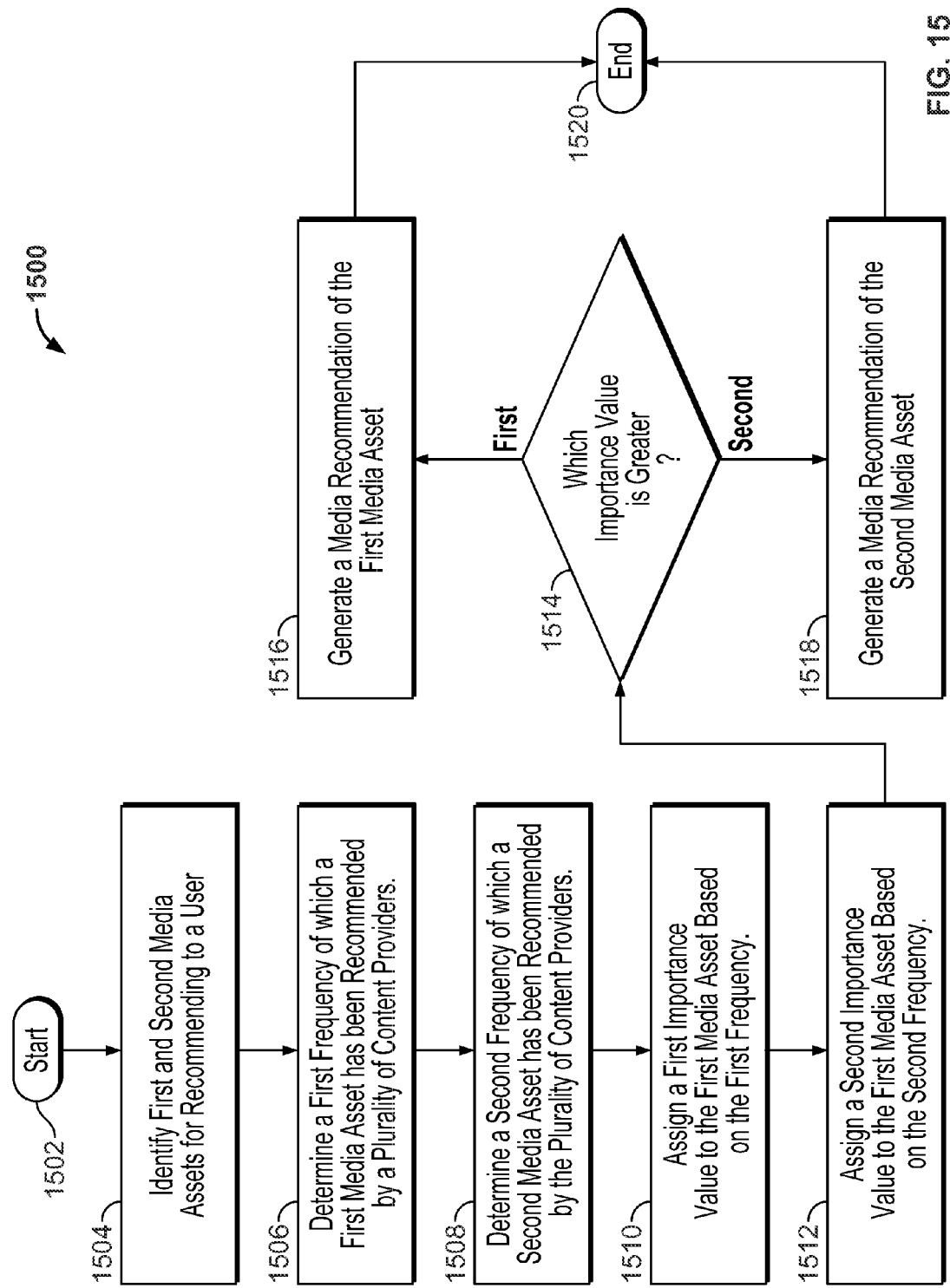
FIG. 15 is a flowchart of the illustrative steps involved in generating a combined recommendation of a frequently recommended media asset in accordance with some embodiments of the disclosure.

FIG. 15 is a flowchart of the illustrative steps involved in generating a combined recommendation of a frequently recommended media asset in accordance with some embodiments of the disclosure. Process 1500 begins at step 1502. At step 1504, recommendation module 428 identifies first and second media assets that have been recommended to the user. Recommendation module may make this determination using any suitable method described herein, including identifying media assets within user-retrieved search results, selection of media assets from an aggregated recommendation database maintained in a storage device of recommendation module 428, direct user selection of at least two media assets, media assets within a user media library maintained on user equipment device 300 or on another user equipment device in communications network 414, or any suitable combination thereof.

At steps 1506 and 1508, recommendation module 428 may determine first and second frequencies of which the first and second media assets, respectively, have been recommended by content providers available to the user. For example, recommendation module 428 may determine from an aggregated recommendation database that the first media asset was recommended to the user by three different content providers, and that the second media asset was recommended to the user by only one content provider available to the user.

At steps 1510 and 1512, recommendation module 428 assigns first and second importance values to the first and second media assets, respectively. Each of the first and second importance values may be a function of the first and second frequencies, respectively. In some embodiments, the first importance value may be assigned the frequency value directly. For example, if the first media asset was recommended three times, an importance value of three may be assigned to the first media asset. In some embodiments, the importance value may be weighted based on importance values associated with the content providers that recommended the media asset.

At step 1514, recommendation module 418 compares the first and second importance values. If recommendation module 428 determines that the first importance value is greater than the second importance value, the process then proceeds to step 1516 and a combined recommendation of the first media asset is generated by recommendation module 428. Alternatively, if recommendation module 428 determines that the second importance value is greater than the first importance value, the process proceeds to step 1518 and a recommendation of the second media asset is generated by recommendation module 428. In some embodiments, if the first and second importance values are equal, recommendations of each of the first and second media asset may be generated by recommendation module 428. In some embodiments, the process may repeat to generate an ordered list of media assets ranked in terms of their importance values. The process concludes at step 1520 and may repeat continuously starting from step 1502.

It should be understood that the above steps of the flow diagrams of FIGS. 12-15 may be executed or performed in any order or sequence not limited to the order and sequence shown and described in the figures. Also, some of the above steps of the flow diagrams of FIGS. 12-15 may be executed or performed substantially simultaneously, where appropriate.

The above-described embodiments of the present disclosure are presented for purposes of illustration and not of limitation, and the present disclosure is limited only by the claims which follow.

What is claimed is:

1. A method for generating a media recommendation, the method comprising:

receiving, using control circuitry, a first indication that a first media recommendation was generated by a first content provider, wherein the first media recommendation is associated with a first media asset;

receiving, using the control circuitry, a second indication that a second media recommendation was generated by a second content provider;

identifying a plurality of media recommendations previously generated by the first content provider;

determining, for each recommendation of the plurality of media recommendations, a first number of successful media recommendations;

assigning a first importance value to the first content provider, wherein the first importance value is a function of a ratio of the first number of successful media recommendations to a total number of media recommendations in the plurality of media recommendations;
  determining, using the control circuitry, whether the second media recommendation is associated with the first media asset; and
  in response to determining that the second media recommendation is associated with the first media asset, generating, using the control circuitry, a combined recommendation representing the first and second media recommendations based on the first importance value.

2. The method of claim 1, wherein determining whether the second media recommendation is associated with the first media asset further comprises computing a third importance value based on the first importance value and the second importance value.

3. The method of claim 2, wherein determining whether the second media recommendation is associated with the first media asset further comprises determining whether the third importance value satisfies a mathematical condition.

4. The method of claim 1, further comprising:
  determining a second plurality of media recommendations previously generated by the second content provider;
  determining, for each recommendation of the second plurality of media recommendations previously generated by the second content provider, a second number of successful media recommendations;
  assigning a second importance value to the second content provider, wherein the second importance value is a function of a ratio of the second number of successful media recommendations to a total number of media recommendations in the second plurality of media recommendations;
  in response to determining that the second media recommendation is not associated with the first media asset, determining whether the user prefers the first content provider over the second content provider based on the first importance value and the second importance value; and
  generating a recommendation of the first media asset based on determining that the user prefers the first content provider.

5. The method of claim 1, wherein:
  the first indication comprises first recommendation metadata;
  the second indication comprises second recommendation metadata; and
  the determining whether the second media recommendation is associated with the first media asset is based on comparing, using the control circuitry, a first field of the first recommendation metadata with a second field of the second recommendation metadata, wherein the first field corresponds to an identifier of the media asset associated with the first media recommendation and the second field corresponds to an identifier of a media asset associated with the second media recommendation.

6. The method of claim 1, further comprising:
  in response to determining that the second media recommendation is associated with a second media asset, determining whether the user has a greater preference for the first content provider than the second content provider; and
  in response to determining that the user has a greater preference for the first content provider than the second content provider, generating a third media recommendation representing the first media recommendation.

7. The method of claim 6, further comprising:
  in response to determining that the second media recommendation is associated with a second media asset, determining whether the user has a greater preference for the second content provider than the first content provider; and
  in response to determining that the user has a greater preference for the second content provider than the first content provider, generating a fourth media recommendation representing the second media recommendation.

8. The method of claim 7, wherein generating a third media recommendation further comprises generating a fourth recommendation of the second media asset, wherein a display of the third media recommendation and the fourth media recommendation is arranged based on a comparison of the first importance value and the second importance value.

9. The method of claim 1, further comprising:
  assigning a first importance value to the first media asset based on a first frequency of which a plurality of content providers have recommended the first media asset to a user; and
  assigning a second importance value to a second media asset based on a second frequency of which the plurality of content providers have recommended the second media asset to the user.

10. A system for generating a media recommendation, the system comprising:
  storage; and
  control circuitry, wherein the control circuitry is configured to:
    receive a first indication that a first media recommendation was generated by a first content provider, wherein the first media recommendation is associated with a first media asset;
    store, in the storage, the first indication;
    receive a second indication that a second media recommendation was generated by a second content provider;
    store, in the storage, the second indication;
    identify a plurality of media recommendations previously generated by the first content provider;
    determine, for each recommendation of the plurality of media recommendations, a first number of successful media recommendations;
    assign a first importance value to the first content provider, wherein the first importance value is a function of a ratio of the first number of successful media recommendations to a total number of media recommendations in the plurality of media recommendations;
    determine whether the second media recommendation is associated with the first media asset; and
    in response to determining that the second media recommendation is associated with the first media asset, generate a combined recommendation representing the first and second media recommendations based on the first importance value.

11. The system of claim 10, wherein the control circuitry is further configured to compute a third importance value based on the first importance value and the second importance value.

12. The system of claim 11, wherein the control circuitry is further configured to determine whether the third importance value satisfies a mathematical condition.

13. The system of claim 10, wherein the control circuitry is further configured to:

determine a second plurality of media recommendations previously generated by the second content provider;

determine, for each recommendation of the second plurality of media recommendations previously generated by the second content provider, a second number of successful media recommendations;

assign a second importance value to the second content provider, wherein the second importance value is a function of a ratio of the second number of successful media recommendations to a total number of media recommendations in the second plurality of media recommendations;

in response to determining that the second media recommendation is not associated with the first media asset, determine whether the user prefers the first content provider over the second content provider based on the first importance value and the second importance value; and generate a recommendation of the first media asset based on determining that the user prefers the first content provider.

14. The system of claim 10, wherein:

the first indication comprises first recommendation metadata; and the second indication comprises second recommendation metadata, and wherein the control circuitry is further configured to compare, a first field of the first recommendation metadata with a second field of the second recommendation metadata, wherein the first field corresponds to an identifier of the media asset associated with the first media recommendation and the second field corresponds to an identifier of a media asset associated with the second media recommendation.

15. The system of claim 10, wherein the control circuitry is further configured to:

in response to determining that the second media recommendation is associated with a second media asset, determine whether the user has a greater preference for the first content provider than the second content provider; and in response to determining that the user has a greater preference for the first content provider than the second content provider, generate a fourth media recommendation of the first media asset.

16. The system of claim 15, wherein the control circuitry is further configured to:

in response to determining that the second media recommendation is associated with a second media asset, determine whether the user has a greater preference for the second content provider than the first content provider; and in response to determining that the user has a greater preference for the second content provider than the first content provider, generate a fifth media recommendation of the second media asset.

17. The system of claim 16, wherein the control circuitry is further configured to generate a fourth recommendation of the second media asset, wherein a display of the third media recommendation and the fourth media recommendation is arranged based on a comparison of the first importance value and the second importance value.

18. The system of claim 10, wherein the control circuitry is further configured to:

assign a first importance value to the first media asset based on a first frequency of which a plurality of content providers have recommended the first media asset to a user; and assign a second importance value to a second media asset based on a second frequency of which the plurality of content providers have recommended the second media asset to the user.

* * * * *